United States Patent
Ganesan

(10) Patent No.: US 6,678,664 B1
(45) Date of Patent: Jan. 13, 2004

(54) CASHLESS TRANSACTIONS WITHOUT CREDIT CARDS, DEBIT CARDS OR CHECKS

(75) Inventor: Ravi Ganesan, Norcross, GA (US)

(73) Assignee: CheckFree Corporation, Dublin, OH (US)

( * ) Notice: Subject to any disclaimer, the term of this patent is extended or adjusted under 35 U.S.C. 154(b) by 0 days.

(21) Appl. No.: 09/299,102

(22) Filed: Apr. 26, 1999

(51) Int. Cl.[7] ............................................. G06F 17/60
(52) U.S. Cl. ................................... 705/39; 235/379
(58) Field of Search .................... 235/379; 705/39; 364/406

(56) References Cited

U.S. PATENT DOCUMENTS

| | | | |
|---|---|---|---|
| 3,852,571 A | 12/1974 | Hall et al. ................ 235/61.7 |
| 4,701,601 A | 10/1987 | Francini et al. ............ 235/449 |
| 4,734,564 A | 3/1988 | Boston et al. ............. 235/380 |
| 4,734,858 A | 3/1988 | Schlafly .................... 364/408 |
| 4,747,050 A | 5/1988 | Brachtl et al. ............ 364/408 |
| 4,775,935 A | 10/1988 | Yourick ..................... 364/401 |
| 4,799,156 A | 1/1989 | Shavit et al. .............. 364/401 |
| 4,812,628 A | 3/1989 | Boston et al. ............. 235/380 |
| 4,822,985 A | 4/1989 | Boggan et al. ............ 235/380 |
| 4,947,028 A | 8/1990 | Gorog ........................ 235/381 |
| 4,961,142 A | 10/1990 | Elliott et al. ............... 364/408 |
| 4,977,595 A | 12/1990 | Ohta et al. ................... 380/24 |
| 4,992,940 A | 2/1991 | Dworkin .................... 364/401 |
| 5,206,488 A | 4/1993 | Teicher ...................... 235/380 |
| 5,220,501 A | 6/1993 | Lawlor et al. ............. 364/408 |
| 5,255,182 A | 10/1993 | Adams ........................ 364/405 |
| 5,283,829 A | 2/1994 | Anderson .................... 380/24 |
| 5,287,270 A | 2/1994 | Hardy et al. .............. 364/408 |
| 5,319,542 A | 6/1994 | King, Jr. et al. .......... 364/401 |
| 5,325,290 A | 6/1994 | Cauffman et al. .......... 364/401 |
| 5,326,959 A | 7/1994 | Perazza ..................... 235/379 |
| 5,336,870 A | 8/1994 | Hughes et al. ............ 235/379 |
| 5,383,113 A | 1/1995 | Kight et al. ................ 364/401 |
| 5,420,405 A | 5/1995 | Chasek ....................... 235/379 |
| 5,428,684 A * | 6/1995 | Akiyama ..................... 380/25 |
| 5,453,601 A | 9/1995 | Rosen ........................ 235/379 |
| 5,455,407 A | 10/1995 | Rosen ........................ 235/380 |
| 5,465,206 A | 11/1995 | Hilt et al. ................... 364/406 |
| 5,477,038 A | 12/1995 | Levine et al. .............. 235/380 |
| 5,483,445 A | 1/1996 | Pickering ................... 364/406 |
| 5,500,513 A | 3/1996 | Langhans et al. .......... 235/380 |
| 5,557,516 A * | 9/1996 | Hogan ........................ 364/406 |
| 5,557,518 A | 9/1996 | Rosen ........................ 364/408 |
| 5,590,197 A | 12/1996 | Chen et al. .................. 280/24 |
| 5,613,012 A | 3/1997 | Hoffman et al. ............ 382/115 |
| 5,655,089 A | 8/1997 | Bucci .......................... 395/240 |
| 5,692,132 A | 11/1997 | Hogan ........................ 395/227 |
| 5,699,528 A | 12/1997 | Hogan ........................ 395/240 |
| 5,710,887 A | 1/1998 | Chelliah et al. ............ 395/226 |
| 5,715,314 A | 2/1998 | Payne et al. ................ 380/24 |
| 5,717,989 A | 2/1998 | Tozzoli et al. .............. 705/37 |
| 5,724,424 A | 3/1998 | Gifford ........................ 380/24 |
| 5,727,163 A | 3/1998 | Bezos ........................ 395/227 |
| 5,727,249 A | 3/1998 | Pollin ......................... 705/40 |
| 5,729,594 A | 3/1998 | Klingman ................. 379/93.12 |
| 5,732,400 A | 3/1998 | Mandler et al. ............ 705/26 |
| 5,949,043 A * | 9/1999 | Hayashida ................. 235/379 |
| 6,003,762 A * | 12/1999 | Hayashida ................. 235/379 |

* cited by examiner

Primary Examiner—Geoffrey R. Akers
(74) Attorney, Agent, or Firm—Antonelli, Terry, Stout & Kraus, LLP

(57) ABSTRACT

Cashless transactions are performed by transmitting information identifying a purchaser of a product without identifying a payment account for the purchaser. The transmitted identifying information is received at a central processing point and processed to determine if the purchaser is a registered purchaser. A notice confirming registration, which may take the form of a purchase authorization, is transmitted from the central processing point if the purchaser is determined to be registered. The transmitted notice is received at the point of purchase and a bill is generated for the purchased product responsive to receipt of the notice.

31 Claims, 15 Drawing Sheets

FIG. 11

| PAYEE/PAYER IDENTIFIER | REG | FI IDENTIFIER | | BILLING INFORMATION | REMITTANCE INFORMATION |
|---|---|---|---|---|---|
| A | Y | I | PA DA | YES | YES |
| B | Y | J | PA | NO | NO |
| C | Y | K | PA DA | YES | NO |
| D | N | UNKNOWN | | YES | NO |
| E | Y | L | DA | NO | YES |
| F | N | UNKNOWN | | NO | YES |
| G | N | UNKNOWN | | YES | NO |
| H | Y | K | PA DA | YES | YES |
| I | Y | I | PA DA | YES | YES |
| J | Y | J | PA DA | YES | YES |
| K | Y | K | PA DA | YES | YES |
| L | Y | L | PA DA | YES | YES |
| n | | | | | |

1105　1110　1115　1120　1125

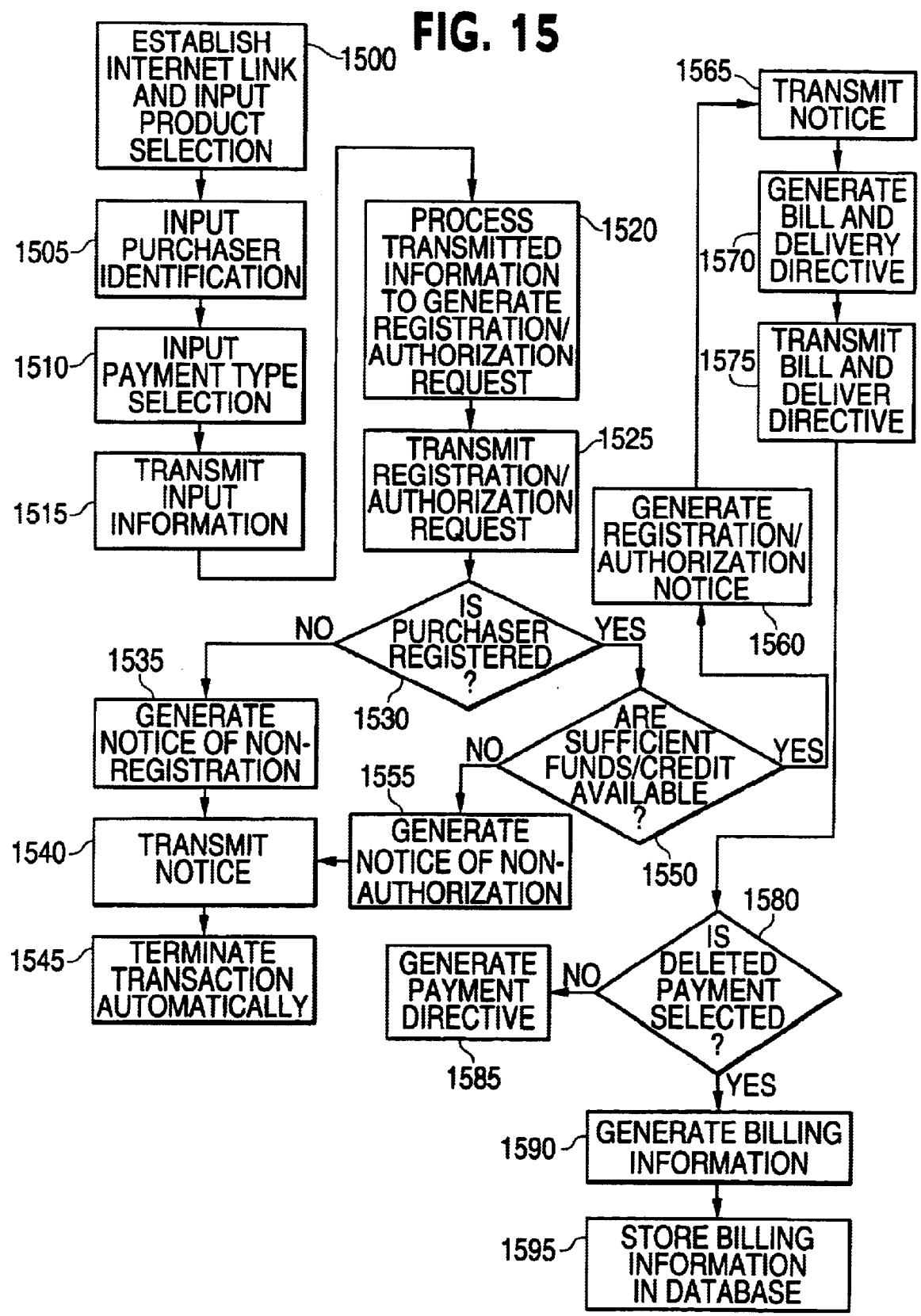

CASHLESS TRANSACTIONS WITHOUT CREDIT CARDS, DEBIT CARDS OR CHECKS

TECHNICAL FIELD

The present invention relates generally to cashless transactions. More specifically, the present invention relates to cashless transactions, including purchases of products by large numbers of consumers from retail stores or Internet sites, without the use of credit cards, debit cards or checks.

BACKGROUND ART

Over the past several years an international network of networks known as the Internet has become increasingly popular. The Internet allows millions of users throughout the world to communicate with each other. To provide users with easier access to information available on Internet, a World Wide Web has been established. The World Wide Web allows information to be organized, searched and presented on the Internet using hypertext. Thus, using the World Wide Web a user can submit a query for information and be linked electronically to information of interest which has been stored at web locations on the Internet. Using hypertext, a user can also communicate information to other users of the Internet. Hence, the Web has made it relatively easy for virtually anyone having access to a personal computer or other device connected to the Internet to communicate with others who are also connected to the network.

With the proliferation of Internet users, numerous services are now provided over the Internet. One of the first such services to be offered was electronic banking. Electronic banking allows banking customers to access their account information and execute banking transactions, e.g. the transfer of funds from a savings to checking account, by simply linking to a bank server using the Internet to access account information and communicate transfer instructions.

More recently, it has become possible to electronically pay bills by communicating instructions, via the Internet, to a financial institute maintaining deposited or credited funds of a pre-registered payer, or to a representative of the financial institute. The payments are then made to the payee by the financial institute or its representative. Funds from the payer's deposit or credit account, i.e. the payer's payment account, are debited by the financial institute to cover the payment. The payment by the financial institute or its representative to the payee can be made in any number of ways.

For example, the financial institute or representative may electronically transfer funds from the payer's payment account to the payee's deposit account, may electronically transfer funds from a financial institute/representative's deposit or credit account, to the payee's deposit account, may prepare a paper draft on the financial institute/ representative account and mail it to the payee, may prepare an electronically printed paper check on the payer's payment account and mail it to the payee, or may make a wire transfer from either the financial institute/representative account or payer's payment account.

If the funds transferred to the payee are drawn from the financial institute/representative account, funds from the payer's payment account are electronically or otherwise transferred by the financial institute to the financial institute/ representative account to cover the payment. Further, if the payment will be made from funds in the financial institute/ representative account, the payment will preferably be consolidated with payments being made to the same payee on behalf of other payers.

Accordingly, such electronic bill payment systems eliminate the need for a payer to write or print paper checks and then forward them by mail to the payee. This makes it easier and more efficient for the payer to make payments. Payees receiving consolidated payments no longer have to deal with checks from each payee and therefore can process payments more efficiently. The making of payments by the electronic or wire transfer of funds provides even further efficiencies in payment processing by payees, and it is well recognized that making payments electronically can significantly reduce the cost of processing payments for both the payer and payee.

The number of users of electronic bill payment services has grown dramatically since introduced by CheckFree Corporation, the assignee of the present application. However, because the billing side of the billing/payment process had not been integrated with the electronic payment process, many potential users remained reluctant to utilize the service.

More particularly, until the recent offering by CheckFree Corporation electronic bill payment systems were operated independent of the bill presentment process. Still today, most conventional electronic bill payment systems generally require that the payee receive a conventional paper bill from a merchant or other billing entity, the exception being for certain bill payments, such as mortgage payments, which can be pre-authorized by the payee. Thus, for most bill payments, it is only after the paper bill has been received that the payee can connect to the electronic bill payment system via the Internet and provide a payment instruction.

Using CheckFree's fully integrated electronic bill presentment and payment system, registered merchants and other payers can electronically present bills to registered consumers and other payees by communicating bills via the Internet, to the electronic presentment/payment service provider, which could be a financial institute/representative or some other service provider. Typically, the bill is stored centrally on the electronic presentment/payment system server. The service provider notifies the payer, for example by Internet email, of the availability bill and the bill can then be accessed by the payer by connecting to the system server, via the Internet, to retrieve the bill. Once connected to the system server, the payer can also communicate a payment instruction to the server and the payment can then be made to the payee as previously described.

Accordingly, CheckFree's electronic bill presentment and payment system eliminates the need for a payee to print paper bills and then forward them by mail to the payer. This makes it easier and more efficient for the payee to issue bills. Payers receiving electronic bills no longer have to deal with paper bills from each payer. The combination of electronic presentment and payment of bills has provided even further efficiencies and cost reductions in billing and payment processing by both payers and payees.

Although electronic bill presentment and particularly integrated electronic bill presentment and payment have received broad user acceptance from both payers and payees, there remains a significant number of potential users of electronic bill presentment and payment services who are reluctant to register for the service. There appear to be various reasons for this reluctance on the part of both payees and payers.

One reason is that electronic bill payment services are generally provided by other than providers of accounts payable software. To pay bills electronically, a business payer must somehow transfer data output from the particular accounts payable software application being utilized to the electronic bill payment system. One way to do this is to manually input data generated by the accounts payable software application to the electronic bill payment system. Manual transfer is a tedious and error prone process. To solve this problem, it has been proposed that specialized software be developed to electronically transfer the data generated by the accounting software application in use to the electronic bill payment system. Others have proposed programming electronic bill payment systems to perform a database query on a new database created using the data output from the applicable accounts payable software and to import the files from this new database for use in performing electronic bill payment processing. It has been further proposed to program electronic bill payment systems to enter the pre-existing database files of the accounts payable software application in use and import the necessary information.

Each of the above methodologies requires substantial modifications to the processes and/or accounts payable software being utilized by payers, and hence substantial cost and effort to implement. This may not be a significant problem for large business entities, since their accounts payable software is often specially developed for their own use and large entities tend to have the necessary expertise and resources to make whatever modifications are required. However, smaller business entities tend to use off the shelf standard accounts payable software and often have little understanding of the software operations, except as a user, and little if any resources to make modifications to the software.

Another reason for the reluctance of some to register for electronic bill presentment and payment is that electronic bill presentment services are also generally provided by other than providers of invoicing software. Thus, to electronically present a bill, a business payee must somehow transfer data output from the particular invoicing software application being utilized to the electronic bill presentment system. Here again, this could be done by manually inputting data generated by the invoicing software application to the electronic bill presentment system, developing specialize software, or programming electronic bill presentment systems to perform a database query on a new database or existing database of information. However, this would also require substantial modifications to the processes and/or invoicing systems being utilized by payees, and hence substantial cost and effort to implement. Here again, although this may not be a significant problem for large business entities, since their invoicing software is often specially developed for their own use and large entities typically have substantial expertise and resources to make whatever modifications are required, smaller business entities most often use off the shelf standard invoicing software and have little understanding of how the software operates, except as a user, and little if any resources to make modifications to the software.

In summary, electronic bill presentment and payment services have been widely embraced, particularly by large business entities which have the expertise and resources to implement the necessary modifications to their pre-existing procedures and systems. However, smaller business entities generally lack the necessary expertise and have been unable or unwilling to allocate the necessary resources to implement such modifications.

Further, although many individuals have registered for electronic bill payment services, a large number of individuals continue to pay bills by written check. Moreover, a significant number of those individuals who are current users of electronic bill payment services do not take advantage of electronic bill presentment services. This may be due, at least in part, to the fact that only a limited number of bills, mainly those from large business entities, are available electronically. If more payees electronically presented bills, it is likely that more payers would want to receive bills electronically. Additionally, if more payers paid bills electronically, it is likely that more payees would be interested in electronically presenting bills. Therefore a need exist for a technique which will reduce, if not eliminate, the barriers to increased usage by individuals and smaller business entities which exist in conventional electronic bill presentment and/or payment system.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

OBJECTIVES

It is an object of the present invention to facilitate cashless transactions without credit cards, debit cards or checks.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

INVENTION SUMMARY

In accordance with the invention, cashless transactions, e.g. purchases of goods and services without making cash payments at the time of purchase, are performed by transmitting, preferably from a point of purchase, information identifying a purchaser of a product without identifying a payment account for the purchaser. The point of purchase could, for example, be a register within a retail store or a server at an Internet site.

Hence, using the invention, cashless purchases can be made, either in person or over a network, without a credit card, such as a VISA™, MASTERCARD™, or DISCOVERCARD™, a debit card, or a check. Further, using the invention as described herein, a purchaser need not disclose any payment account information, e.g. a bank account number, credit card account number or debit card account number, to sellers. Rather, general identifying information is all that is required to make cashless purchases. This is true whether the purchased product will be paid for by immediately transferring deposited or credited funds in the purchaser's payment account to the seller, or by subsequently transferring such funds, say within thirty (30) days from the date of purchase, to the seller.

The immediate payment feature allows purchasers to make non-credit purchases much as they do today using debit cards or checks, but without the need to carry a debit card or checkbook or to divulge a debit or checking account number to the seller. The delayed payment feature allows purchasers to make credit purchases in much the same way as they do today using credit cards, but without the need to carry a credit card or to divulge a credit card account number to the seller.

For in-store purchases, the identifying information can be limited to information appearing on or embedded in a single identifying document, such as a drivers license, passport or some other type identifying document. The information may appear in human or non-human readable form. For example, the information may appear as a type of indicia, such as a bar code, which is printed on the document, or may be stored on a magnetic strip or memory chip embedded within the document. This will allow the information to be scanned or otherwise read from the document to quickly extract the purchaser's identifying information from the document.

The identifying information could be limited to the purchaser's name, address, and drivers license or passport number, or some other identification code for the purchaser. Preferably, the identifying document includes a photograph of the purchaser so that a store register operator may, if desired, verify the purchaser's identity from the photograph. It will be recognized that a photograph appears on virtually all, if not all, drivers licenses currently issued in the United States and on all known passports.

If further confirmation of identify is desired, other identifying information not appearing on the document, such as the purchasers home or office telephone number, social security number, or mother's maiden name could be utilized. The latter information is preferably of the type which most purchasers have committed to memory and which is not found on the purchaser's drivers license, passport or other identifying document.

The identifying information can be provided by the user without disclosure to the store register operator. That is, the purchaser may physically swipe the document through an optical, electrical, electro-magnetic or other type scanner to read the information on the document or may physically input the information on a keyboard, keypad or other manual input device. Purchaser operated scanners, keypads and other type input devices have already become common at check-out counters of large supermarkets and other retail store outlets. It is strongly preferred that, in all cases, the additional identifying information used to confirm the purchasers identity be entered directly by the purchaser using an input device.

For Internet purchases, the identifying information is preferably identical to that required for in-store purchasers, although this is not mandatory. However, because there is no register operator to verify the purchaser's identity from a photograph appearing on the purchaser's identifying document, it may be particularly desirable to require the additional information described above as further confirmation of the purchaser's identity. In the future, it is likely that an image of the purchaser's face will be easily transmitted over the network and can be electronically compared with a previously stored digitized representation of the purchaser's face to automatically verify the identity of the purchaser. However, at least for the present, the additional identifying information discussed above can be provided by the purchaser to verify his/her identity when purchasing over the Internet, even if not required for purchases made in person.

Additionally, an Internet email address or network locator, such as a universal resource locator (URL), associated with the purchaser could also or alternatively be used for purposes of identification confirmation.

In the case of Internet purchases, the identifying information will typically be entered directly by the purchaser using a computer keyboard or other input device which forms part of the network station being used by the purchaser. In the future, it may be possible to scan information at virtually any network station. Whatever the identifying information, it is worth reiterating that no payment account information is required to be disclosed and that no credit, debit or other type payment card and no check need be carried or used to purchase a product either in person or over the Internet.

For Internet purchases, the transmitted identifying information is preferably received at the point of purchase, typically a seller's network server, and then transmitted over the network to a central processing point. The identifying information is ultimately received at the central processing point, typically one or a group of network servers, and processed at the central processing point to determine if the purchaser is a registered purchaser. If so, a notice confirming registration is transmitted from the central processing point and received at the point of purchase. A bill for the purchased product is generated, in digital form, at the point of purchase in response to the receipt of the confirmation of registration.

Advantageously, the purchase price of the product is also transmitted from the point of purchase, typically with the identifying information. This information is received and processed at the central processing point to determine if the purchase price exceeds a threshold amount, such as a predetermined purchase price limit. The purchase price limit could, for example, represent a pre-established credit limit for the purchaser or the amount of funds on deposit in the purchaser's payment account. The notice confirming registration of the purchaser may include a purchase authorization or can, if desired, take the form of an authorization if the purchase price is determined not to exceed the threshold amount. Hence, the authorization may serve as the notice confirming registration or an authorization and confirmation notice may be transmitted in a unitary transmission.

According to other aspects of the invention, the generated bill is printed, in human readable form, at the point of purchase, at least in the case of in-person purchases. The signature of the purchaser is obtained on the printed bill. This is similar to the process currently used for in-person purchases made with a credit or debit card. Preferably, the purchaser's signature is digitized. As will be recognized by those skilled in the art, analog to digital signature converters have recently become more common. For example, electronic signature pads which read the purchaser's signature as the printed bill is being signed and then digitize the signature are now in use in a number of retail stores.

The generated bill is also transmitted, in digital form, from the point of purchase, and received and processed at the central processing point to generate billing information representing the bill. The billing information may be stored in a central database so as to be accessible to the purchaser.

Preferably, the purchaser's digitized signature, if available, is associated with the generated bill and likewise transmitted from the point of purchase. In such cases, the transmitted digitized signature is also received at the central processing point and stored in the central database as part of the stored billing information. Beneficially, the transmitted digitized signature is also centrally processed for comparison with a previously stored digitized signature of the purchaser.

The purchaser may be given the option to select either immediate or delayed payment of the bill. More particularly, the purchaser may use an input device at the point of sale or his/her Internet station to select a desired payment option. The selection is communicated from the point of sale and centrally received and processed. If payment is to be made immediately, the transmitted bill can be centrally processed to automatically generate a directive to pay the bill responsive to receipt of the bill. Therefore, there is no need for the payee to subsequently authorize payment. Hence, it may be unnecessary to store the billing information in the central database so as to be accessible to the purchaser. Accordingly, in one preferred implementation of the invention, the billing information is only stored in the central database if delayed payment is selected by the payee.

The central processing station will typically include a processor capable of receiving, processing and transmitting information, and a memory for storing billing information so as to be accessible to the purchaser on request. This station together with a number of different seller point of sale stations and, for Internet transactions, a number of different purchaser stations form the cashless transaction network.

BRIEF DESCRIPTION OF DRAWINGS

FIG. 11 is a simplified depiction of a central database for storing electronic billing and remittance information, in accordance with the present invention.

FIG. 15 is a flow chart showing the operations which are performed by the network stations in FIG. 14, in accordance with the present invention.

BEST MODE FOR CARRYING OUT THE INVENTION

Figure 1:
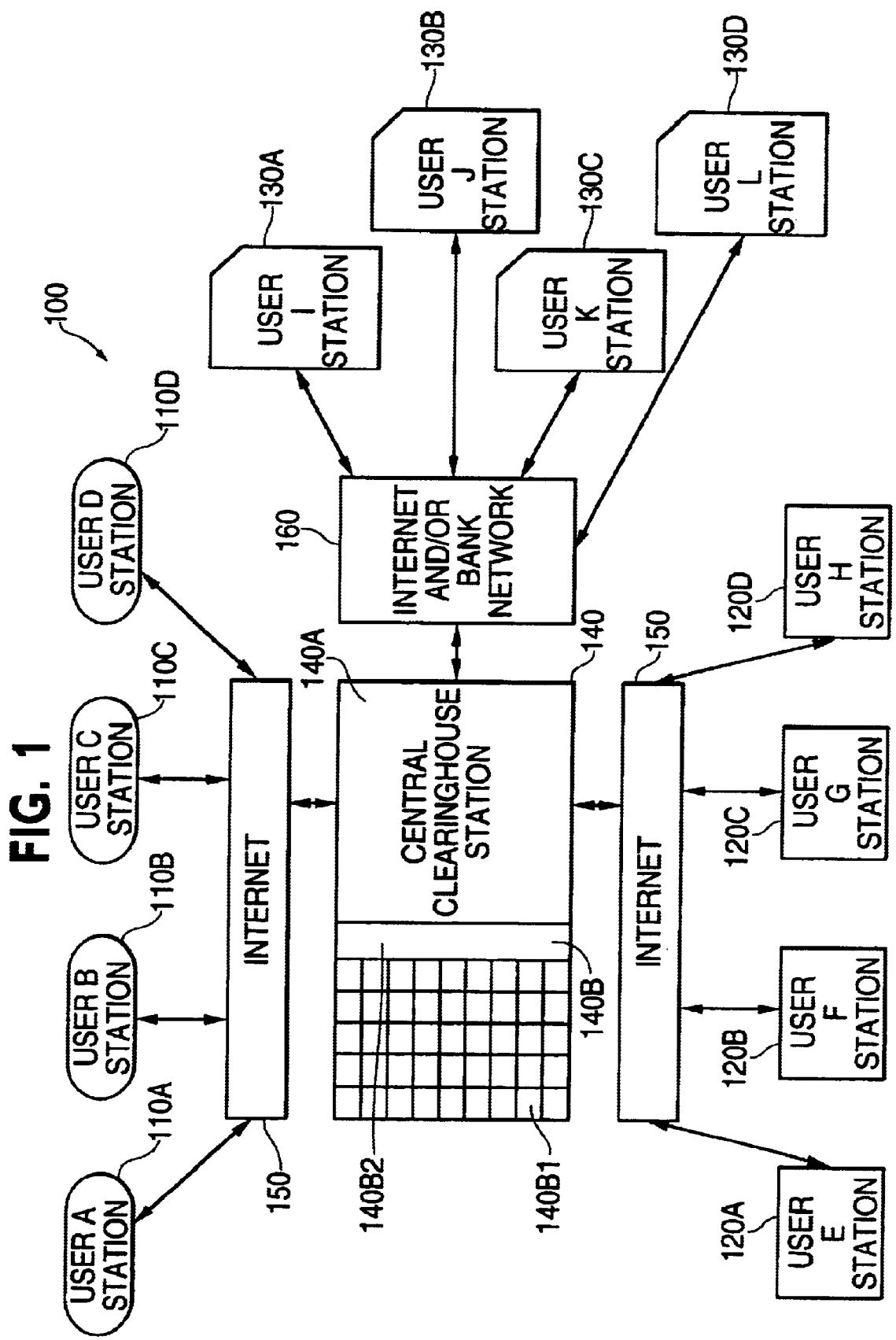
FIG. 1 depicts an electronic bill presentation and payment network in accordance with the present invention.

As shown in FIG. 1, a bill presentment and payment network 100 includes a large number of user stations represented as payer stations 110A–110D, respectively representing users A–D, and payee stations 120A–120D, respectively representing users E–H. It will be recognized that the network 100 preferably includes many thousands if not millions of payer stations and payee stations. The payer and payee stations are capable of communicating via the Internet 150, although it will be understood that some other communications network could be utilized in lieu of the Internet.

Also included in the network 100 are a large number of financial institute (FI) stations 130A–130D, respectively representing financial institutes I–L. The FI stations 130A–130D are capable of connecting to a communications network 160 which could be the Internet and/or a more secure communications network such as the conventional ACH communications network or some other inter-bank communications network. Additionally included in the network 100 is a central clearinghouse station 140. Station 140 includes a processor 140A and memory 140B. The memory 140B stores a database 140B1 for storing billing and remittance information, and bill presentment and programmed instructions 140B2. Each payer A–D has a payment account maintained at one of the financial institutes I–L and each payee E–H has a deposit account maintained at one of the financial institutes I–L.

Although, as shown, each of the payer stations 110A–110D and payee stations 120A–120D, can communicate with the central clearinghouse station 140 via the Internet 150, for purposes of the following description, only certain of the payers A–D and payees E–H are registered to electronically present and/or pay bills on network 150. More particularly, for purposes of the following discussion, payer D and payees F and G are unregistered users of network 100. Further, payer A is an individual and payer B is a small business entity which utilizes a standard accounts payable software package. Payee H is also a small business entity which utilizes a standard invoicing software package.

To facilitate the use of the electronic bill presentment and payment services, the central clearinghouse station 140 operates in accordance with instructions 140B2, to perform a simplified registration process. More particularly, for small payees such as payee H, the registration process preferably requires only that payee H provide its identification, its deposit account number and an identification of financial institute at which its deposit account is maintained. This information is stored in the relational database 140B1 of the memory 140B in association with a payee H identifier. Having this information, the central clearinghouse station processor 140A can now direct payments, preferably by electronic fund transfer, to the deposit account of payee H. The central clearinghouse station processor 140A also operates to generate remittance information for each payment directed or to be directed to payee H, as will further described below, and to direct the storage of such information in the relational database 140B1 in association with the payee H identifier. Thus, the database 140B1 serves as a temporary depository for remittance information corresponding to any payments directed to payee H's deposit account on behalf of other network users.

To register payer A, the central clearinghouse station 140 preferably requires only payer A's identification, the number of its payment account and information identifying the financial institute at which the payment account is maintained. The central clearinghouse station processor 140A operates to store this information in the database 140B1 of the memory 140B in relation to a payer A identifier. The processor 140A also operates to generate billing information for each bill received from a registered payee for payment by payer A and to direct the storage of such information in the database 140B1 in association with the payer A identifier. Thus, the database 140B1 serves as a temporary depository for billing information which may be provided by any of the registered payees.

The processor 140A further functions to electronically receive bills from registered payees in the form output by any commonly used standard invoicing software packages, such as Quickbooks, Peachtree and other off-the-shelf invoicing software, or alternatively in ASCII or other text format and to convert the received bill into standard format billing information for storage in the database 140B1 in relationship with the applicable payer identifier for subsequent presentment to the applicable payer station 110A–D. Accordingly, registered payees need not modify their existing invoicing software or substantially modify their existing procedures, other than to transmit the bill output from their existing invoicing software via the Internet 150 to the central clearinghouse station 140, to have their bills electronically presented to the applicable payer.

The central clearinghouse station processor 140A is capable of generating remittance information in multiple standard formats, compatible with all the commonly used invoicing software, and in ASCII or other text format. The station processor 140A directs the storage of the formatted remittance information in the database 140B1 of memory 140B in association with the applicable payee identifier. The remittance information can be generated and stored in all the above mentioned formats. Alternatively, the applicable payee can select, or otherwise identify, a particular one of the formats in which it wishes to receive remittance information. Using this later alternative, the remittance information is formatted and stored only in the requested format. Accordingly, registered payees can obtain remittance advice by simply using a browser to contact the central clearinghouse station 140 and requesting the stored remittance information. Responsive to the request, the central clearinghouse station processor 140A retrieves the applicable remittance information from the database 140B1 and transmits the information via the Internet 150 to the applicable payee station. Because the information will typically be received in at least one format usable by the payee's standard invoicing software, this information can be directly input to the accounts receivable system and processed in the conventional manner.

Figure 2:
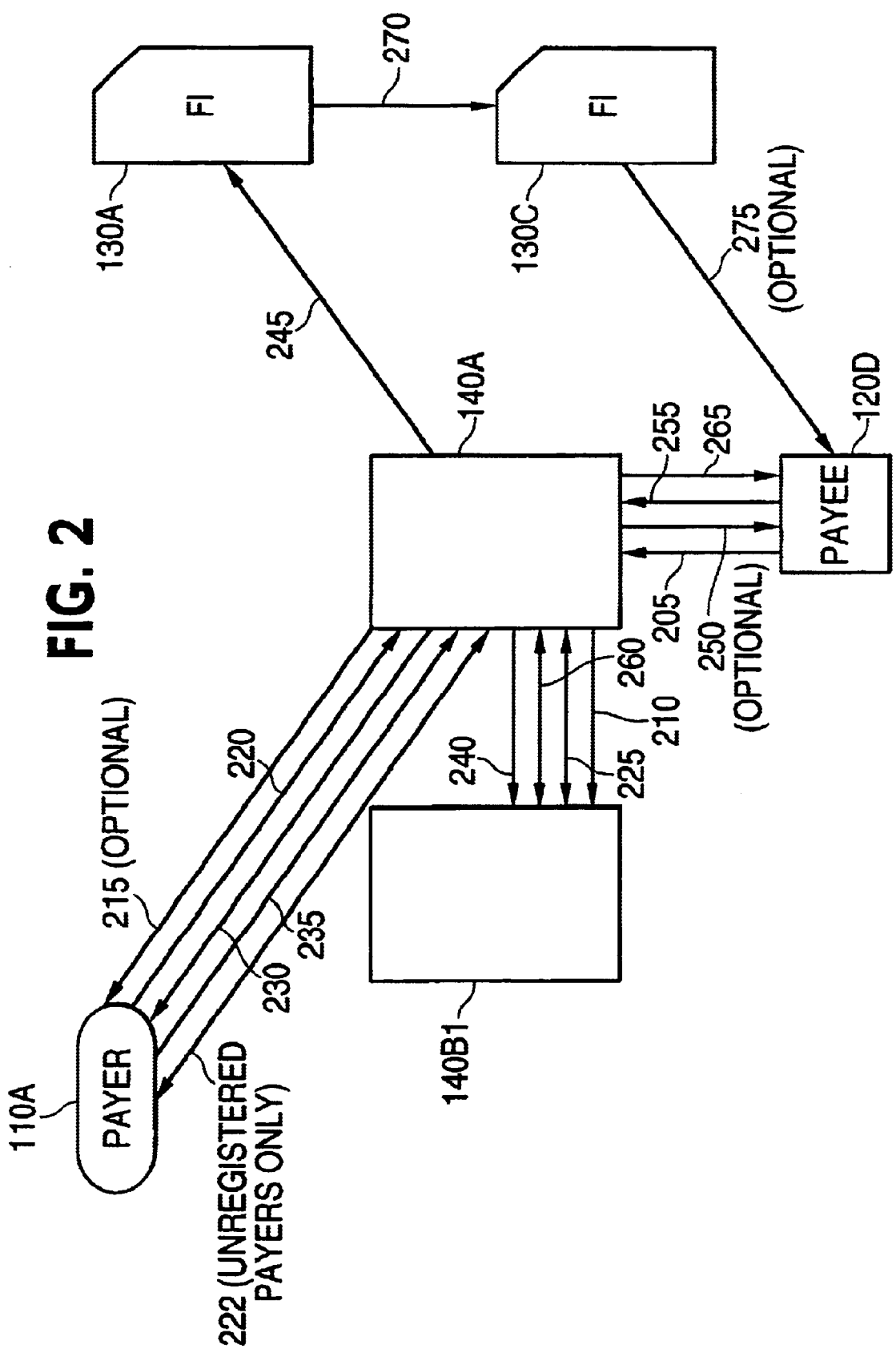
FIG. 2 depicts the communications between various network stations depicted in FIG. 1, in accordance with the present invention.
Figure 4:
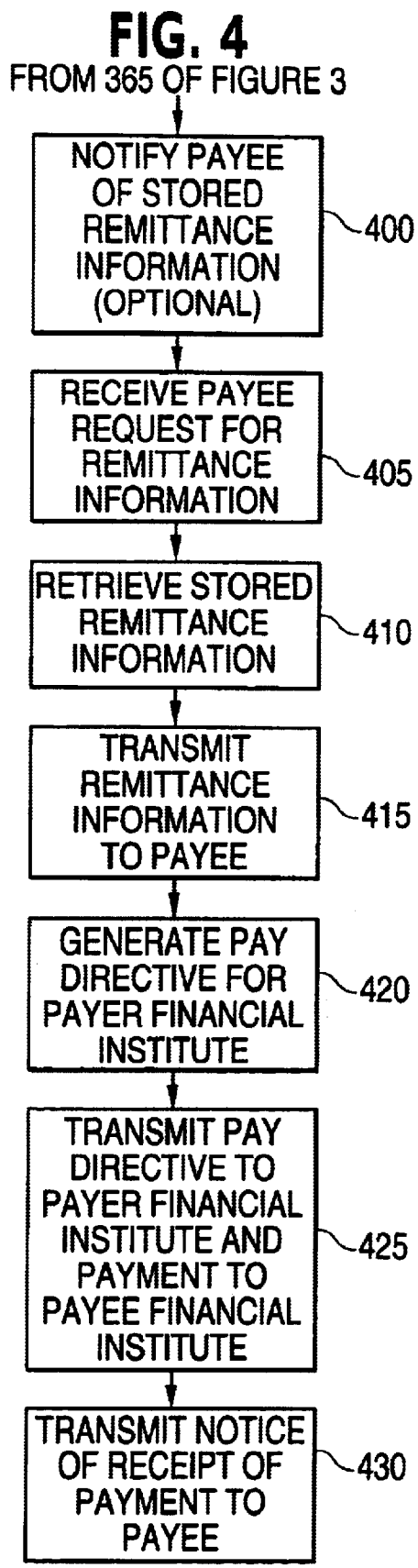
FIG. 4 is a flow chart showing the operations which are, in a second alternative, performed by the network stations in FIG. 2, in accordance with the present invention.
Figure 5:
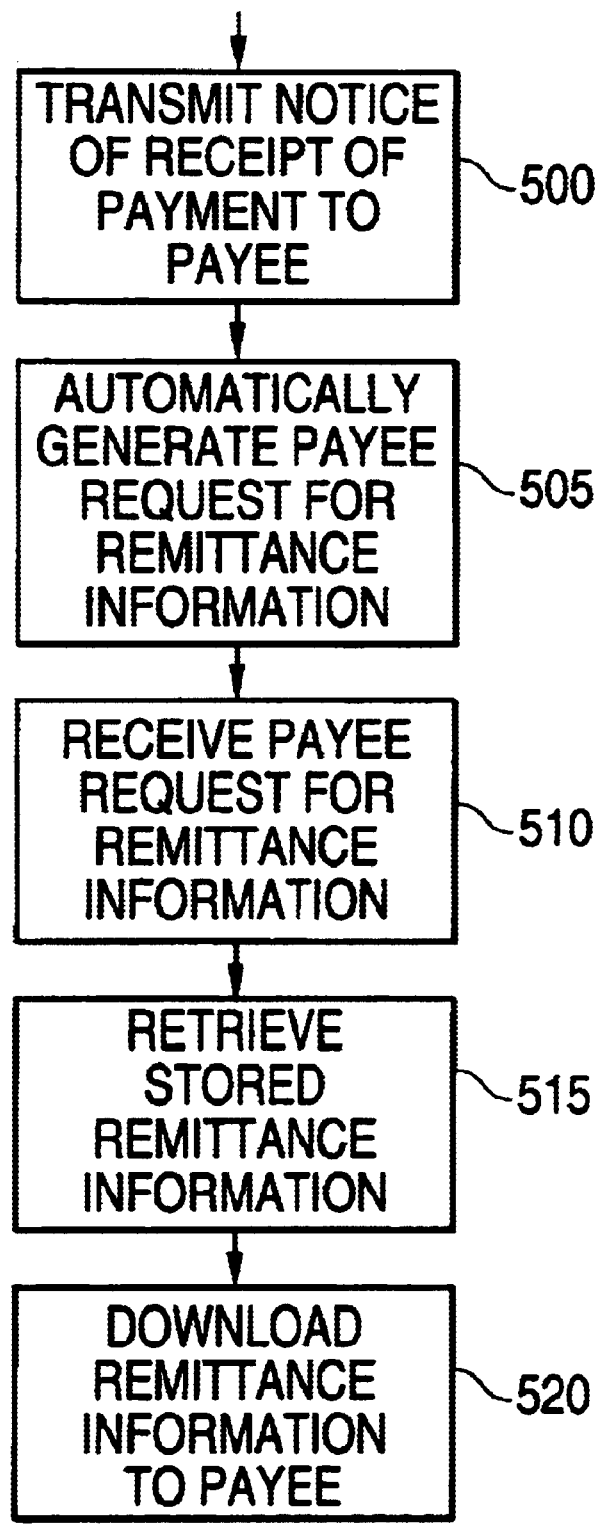
FIG. 5 is a flow chart showing the operations which are, in a third alternative, performed by the network stations in FIG. 2, in accordance with the present invention.
Figure 6:
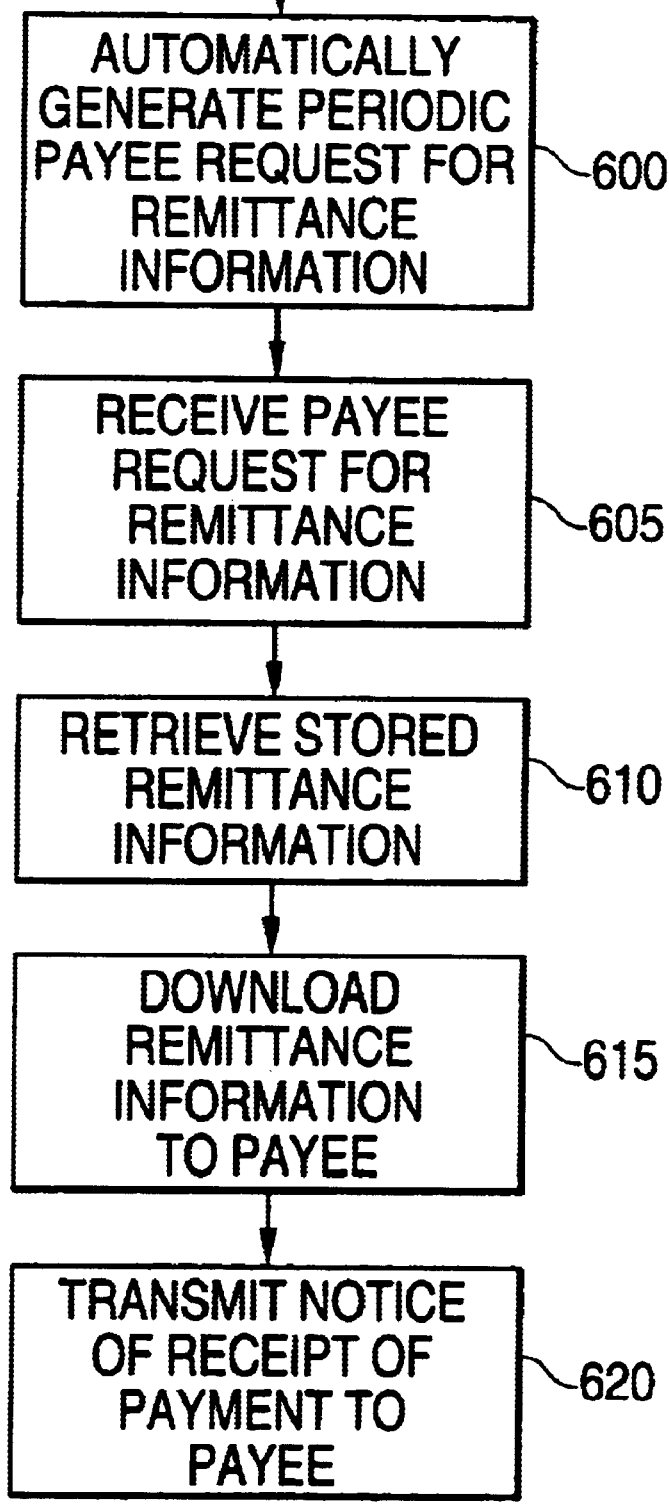
FIG. 6 is a flow chart showing the operations which are, in a fourth alternative, performed by the network stations in FIG. 2, in accordance with the present invention.

FIG. 2 depicts the communications between various network stations to electronically present and pay bills. FIGS. 4–6 show certain alternative operations which can be performed by the network stations of FIG. 2.

Figure 3:
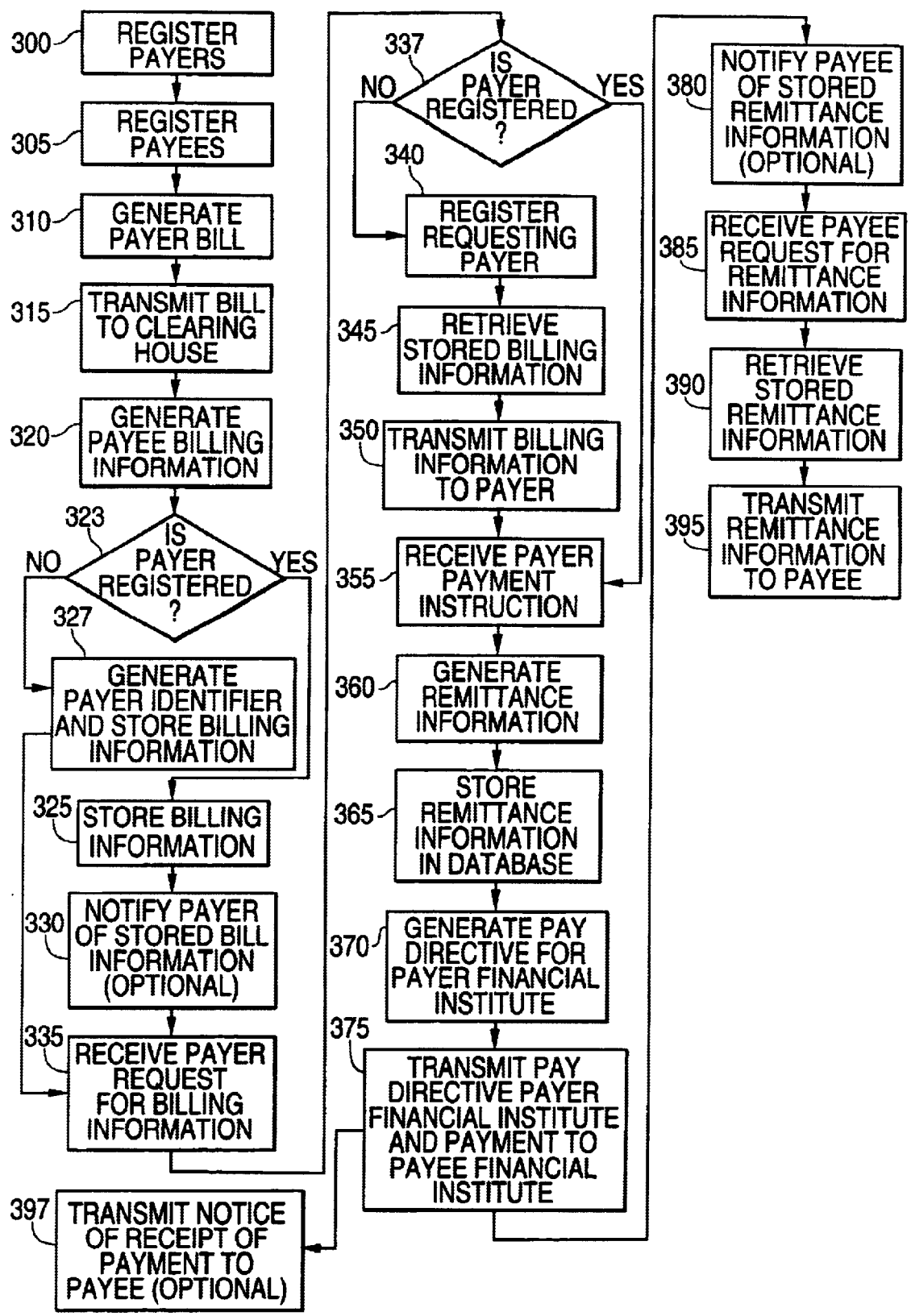
FIG. 3 is a flow chart showing the operations which are, in a first alternative, performed by the network stations in FIG. 2, in accordance with the present invention.

Turning first to FIGS. 2 and 3, the payer A and payee H are registered in steps 300 and 305 of FIG. 3. Payee H, represented by station 120D, generates, in step 310 in FIG. 3, a bill to payer A, represented by station 110A. The bill is generated by a standard invoicing software package. The output of the software, which represents the bill, is transmitted in communication 205 from the payee station 120D to the central clearinghouse station 140, as indicated in step 315 of FIG. 3. The central clearinghouse station processor 140A, in accordance with programmed instructions 140B2, processes the received bill to generate standard format billing information in step 320.

The processor 140A also determines if the identified payer A is registered, as indicated in step 323. If so, as is the case here, the processor 140A, in communication 210, directs the storage of the billing information in the relational database 140B1 of the memory 140B in association with the payer A identifier, as shown in step 325, and may optionally generate and transmit a notification to the payer station 110A of the availability of stored billing information, as indicated by communication 215 and step 330. If the bill were for unregistered payer D rather than payer A, a payer D identifier is generated based upon the billing information and the billing information is stored in the database 140B1 in association with the generated payer identifier, as indicated by communication 210 and step 327. Preferably, no notice is provided by the central station to unregistered payers.

A request for the billing information, as indicated in step 335, is transmitted in a communication 220 to the central clearinghouse station 140 from station 110A. The processor 140A determines whether or not the request is from a registered payer in step 337. If the request were from unregistered payer D rather than registered payer A, the processor 140A would transmit a query to station 110D to determine if user D desires to register and thereby obtain access to its billing information which is stored on database 140B1. Optionally, an unregistered payer could be provided with limited access to its stored electronic billing information to sample the service based upon providing sufficient information to verify the payer's identity, but without the need to provide a payment account number and associated financial institute information.

Thus, it should be understood that the central clearinghouse station 140 operates to generate and direct the storage of billing information in association with registered and unregistered payer identifiers as may be desired by a registered payee. If billing information for an unregistered payer is stored in the database, the payee may inform the unregistered payer, perhaps in correspondence enclosed with a paper copy of the bill mailed to the unregistered payer, that the bill is available and payable electronically and can be accessed by contacting the central clearinghouse station 140 at its Internet web site, thereby motivating the unregistered payer to register for electronic bill presentment and/or payment services. Preferably, the non-registered requesting payer is registered via communications 222 in step 340. It will of course be noted that although communications 222 are shown in FIG. 2 for completeness, since payer A has pre-registered, these communication would not actually occur with station 110A but would be required, for example, with station 110D in order to register payer D.

As indicated in step 345, the processor 140A retrieves the applicable billing information from the database 140B1 of memory 140B responsive to the access request from station 110A, as indicated by communication 225. The retrieved information is then communicated by the station 140, as directed by processor 140A, to the payer station 110A via communication 230, as indicated in step 350. In step 355, the processor 140A receives a payment instruction via communication 235 from the payer station 110A. Based upon the instruction, the processor 140A generates remittance information in step 360 and directs the storage of the remittance information in the database 140B1 of memory 140B in association with the payee H identifier via the communication 240, as indicated in step 365.

The processor 140A also generates a pay directive in step 370. As discussed above, payment may be accomplished in various ways. However, preferably the directive is to the financial institute I, represented by station 130A, which maintains a payment account for the payee A. The directive is transmitted via communication 245 to the FI station 130A and the payment funds are transferred electronically in communication 270, for deposit in the payee H deposit account maintained at financial institute K, represented by FI station 130C, as indicated in step 375. The financial institute K may, if desired, notify payee H via communication 275 to station 120D, of the receipt of the deposit, as indicated in step 397. It should be understood that the generation and storage of the remittance information and the generation and/or transmission of the pay directive may occur substantially simultaneously or at different times, as will be described further below.

Optionally, although not preferably, an email or other notice is sent via communication 250 to the payee station 120D, to notify the payee of the availability of the stored remittance information, as indicated in step 380. In step 385, a request for remittance information is transmitted in communication 255 from the payee station 120D to the central station 140. Communications 260, between processor 140A and memory 140B, result in the retrieval of the remittance information from the database 140B1 in response to the request, as indicated in step 390. The retrieved information is transmitted from the central station 140, as directed by processor 140A, to the payee station 120D via communication 265, as indicated in step 395. The payer A can also communicate with financial institute I, preferably via central station 140, to electronically confirm the transfer of the payment amount from its payment account and the payee H can also communicate with financial institute K, preferably via central station 140, to electronically confirm the transfer of payment amount to its deposit account, as will be understood by those skilled in the art.

In FIG. 4, an alternative implementation of certain operations is shown. As indicated in FIG. 4, the operations are identical to those shown in FIG. 3 through step 365. However, in lieu of steps 370–397, prior to generating the pay directive, notice is optionally sent via communications 250 to the payee as indicated in step 400. A request for remittance information is received from payee station 120D via communication 255, as indicated by step 405. Responsive thereto, the stored remittance information is retrieved from the database 140B1 by the processor 140A via communications 260, as indicated in step 410, and transmitted via communication 265 from the central station 140, under the direction of the processor 140A, to the payee station 120D, as reflected by step 415.

The pay directive is generated by the central station processor 140A in step 420 after the request has been received from the payee H for the remittance information. The pay directive could alternatively be generated before receipt of the request for remittance information if so desired. However, under the FIG. 4 implementation, the pay directive is only transmitted, in this case to the applicable FI station 130A via the communication 245, after the request for remittance information has been received from the payee H.

The electronic fund transfer is then made between FI stations 130A and 130C via communication 270, as indicated in step 425. A notice is subsequently transmitted from station 130C to the payee station 120D indicating receipt of the payment, as reflected in step 430. The alternative operating sequence shown in FIG. 4 is particularly beneficial in avoiding erroneous dunning notices which could occur if payments are actually made but the recipient payee has failed to retrieve the remittance information from database 140B1 and hence to account for the payment in its records.

FIG. 5 sets forth another alternative operational sequence which can be performed by the network stations of FIG. 2. As indicated, the station operations are identical to those shown in FIG. 3 through step 375. In accordance with the FIG. 5 operations, in step 500 the FI station 130C transmits the notice of receipt of payment to payee station 120D via communication 275. Payee station 120D, responsive to the receipt of the notice from FI station 130C, automatically generates a request for the associated remittance information in step 505. In communication 255, the remittance information request is automatically transmitted to the central clearinghouse station 140, where it is received by the central station processor 140A as indicated in step 510. Accordingly, in this implementation the accounts receivable system being utilized by payee H is programmed such that, upon receipt of a notice of payment from its financial institute K, a request for remittance information is automatically generated and transmitted to the central station 140. The remittance information is retrieved from the database 140B1 of memory 140B via communications 260, as indicated in step 515. The retrieved remittance information is then downloaded in communication 265 to the payee station 120D, as reflected in step 520.

It should be noted that in this particular alternative implementation it is strongly preferred that the remittance information be automatically downloaded to the payee station 120D. The downloading of the remittance information allows this information to be automatically entered at the payee station 120D for accounts receivable processing. However, even though it is strongly preferred that the remittance information be downloaded in the FIG. 5 implementation, this is not mandatory, and it will be recognized that, in some cases, it may be desirable for an operator of payee station 120D to view automatically transmitted remittance information and manually enter the information for accounts receivable processing, thus possibly eliminating the need to actually download the remittance information. By contrast, in other alternative implementations described herein, the remittance information can be either transmitted for viewing at payee station 120D or downloaded to the payee station 120D as may be desirable under the particular circumstances, without preference.

In still another alternative implementation, operations are performed in a still different sequence, as shown in FIG. 6. In this implementation, the payee station operates to automatically request remittance information on a periodic basis, such as daily or hourly and typically at fixed times, for entry into the account receivable system. It will be recognized that standard accounts receivable systems can be easily modified to automatically make such periodic request. It will also be recognized that such systems could alternatively be easily modified to automatically receive a download of the remittance information on a periodic basis without request, if so desired. In either case, this should generally ensure that the payer is credited with the payment on a timely basis even if payments are made immediately after receiving a payment instruction. Accordingly, the FIG. 6 implementation eliminates the need to withhold actual payments until after remittance information has been requested by payees as in the FIG. 5 implementation while still providing an assurance that payments will be promptly accounted for by the payee.

Referring more particularly to FIG. 6, as indicated in step 600, the payee station 120D automatically generates a request for remittance information on a periodic basis, in this case at 11:00PM each evening. In communication 255, the remittance information request is transmitted and received by the central station processor 140A, as indicated in step 605. The remittance information is retrieved by station processor 140A from the database 140B1 of memory 140B via communications 260, as indicated in step 610. The retrieved remittance information is then downloaded in communication 265 from central station 140 to the payee station 120D, as reflected in step 615. The FI station 130C transmits the notice of receipt of payment in communication 275, as indicated in step 620.

As noted above, electronic bills may be stored in the database 140B1 of memory 140B even for those payers who are not registered with the central station 140. Further, bills may be electronically stored in the database 140B1 for registered users even if the particular registered user has not requested electronic bill presentment. Accordingly, the central station 140 operates to direct registered users who contact the central station 140 to make payments on the basis of paper bills to the electronic billing information available on the database 140B1 of memory 140B.

Figure 7:
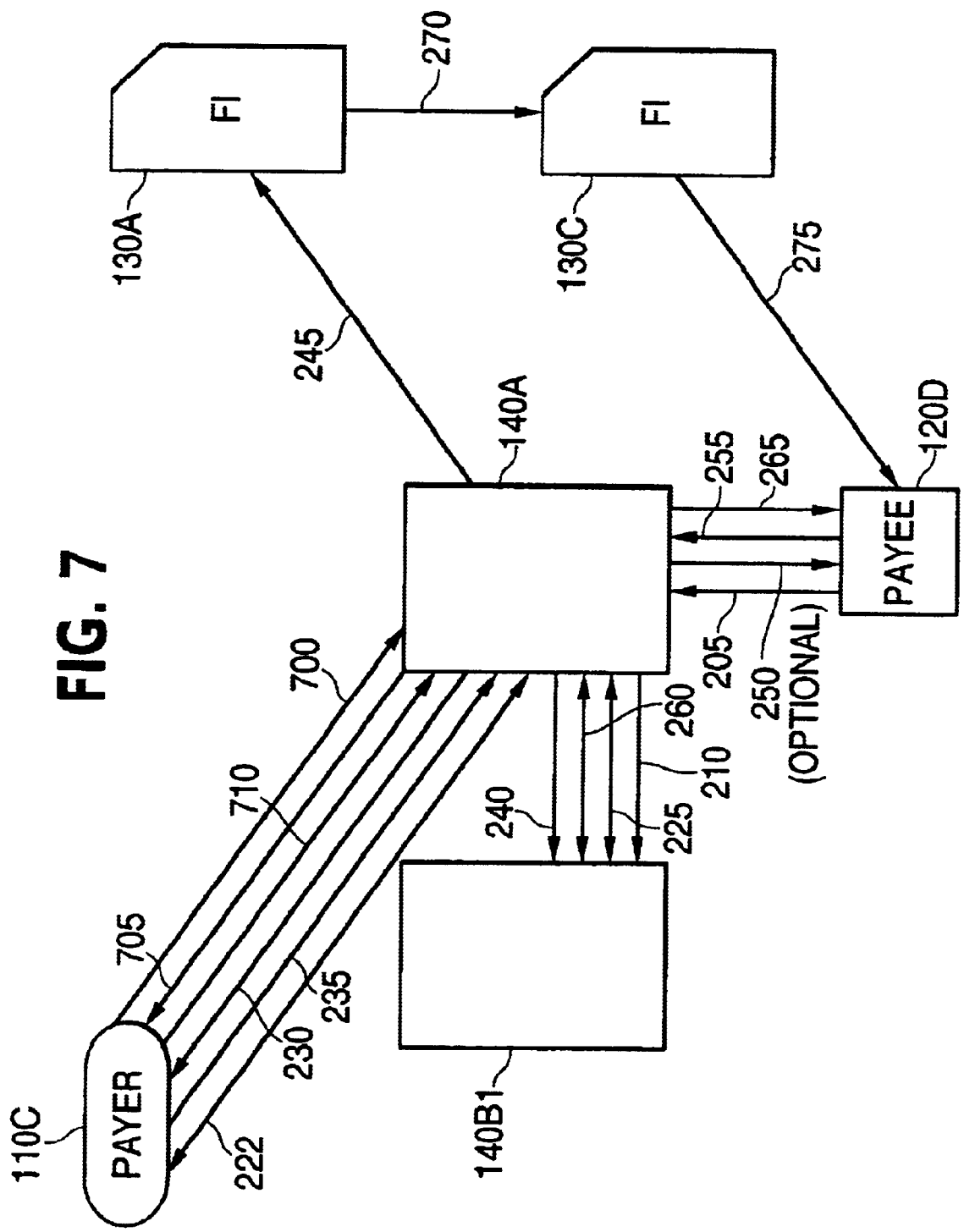
FIG. 7 depicts the communications between various network stations depicted in FIG. 1 to direct payers to electronic bills, in accordance with the present invention.
Figure 8:
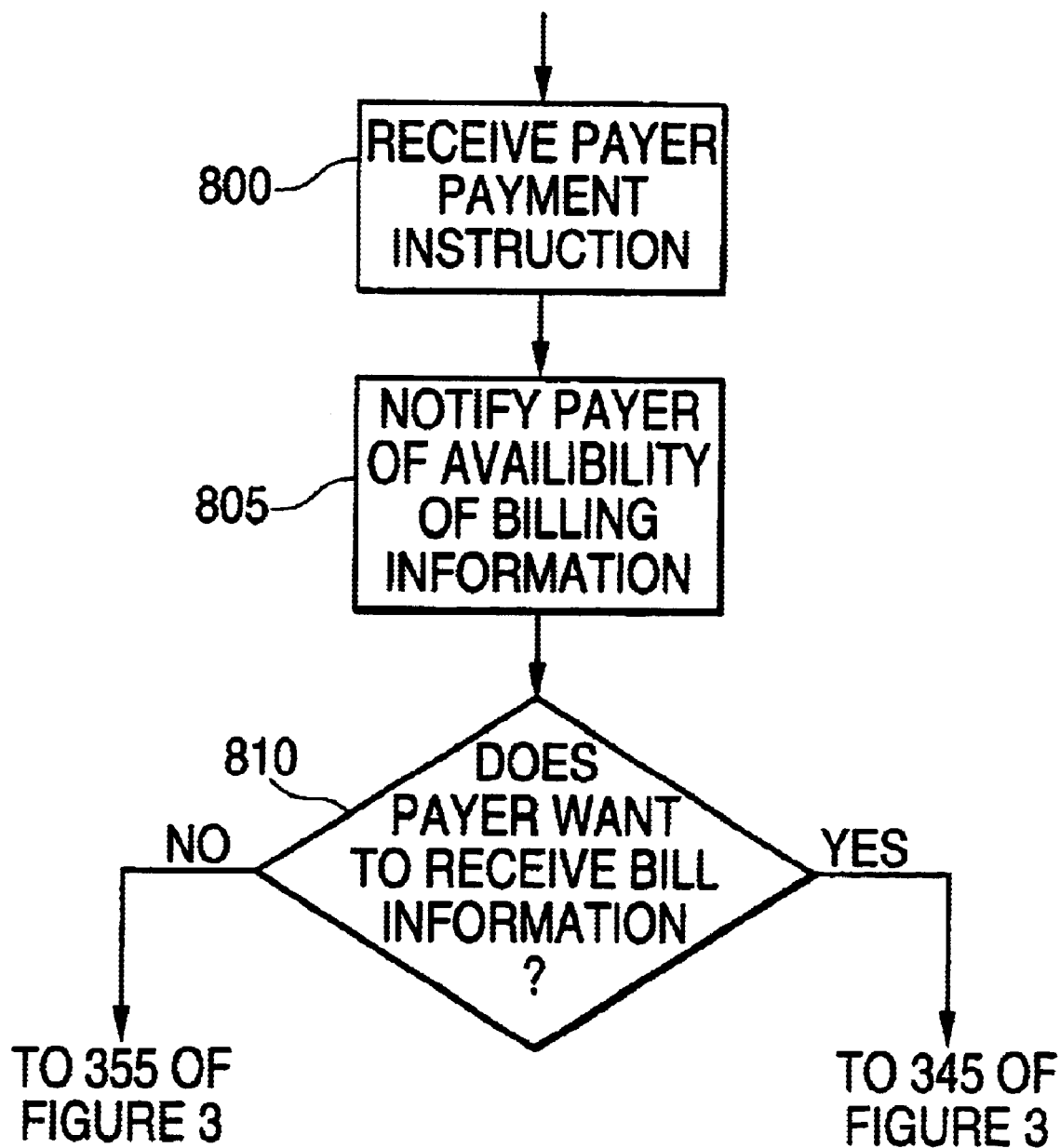
FIG. 8 is a flow chart showing the operations which are performed by the network stations in FIG. 7, in accordance with the present invention.

FIG. 7 is similar to FIG. 2 except that communications 215 and 220 are replaced by communications 700, 705 and 710 which will be described below. As shown in FIGS. 7 and 8, a payment instruction, to pay a paper bill received in the mail by registered payer C, is transmitted by communication 700 from the payer station 110C to the central station 140, and received by the central station processor 140A, as indicated by step 800. In communication 705, the central station 140, directed by the processor 140A, notifies the applicable payer station 110C, of the availability of electronic billing information which is stored in the database 140B1 of memory 140B in association with the user C identifier, as reflected in step 805. The central station processor 140A generates an inquiry to the payer C, inquiring if the payer C wishes to receive the billing information. The inquiry is also transmitted from central station 140 to payer station 110C in communication 705, as indicated in step 810. The payer C responds to the query in communication 710 from the payer 110C to central station 140. If the payer C responds in the affirmative, i.e. indicating a desire to access to the billing information stored in the database 140B1, operations continue as previously described beginning with step 345 of FIG. 3. If the payer C responds in the negative, operations continue as previously described beginning with step 355 of FIG. 3. It will be recognized that thereafter the operations may continue as indicated in any of FIGS. 3–5.

Figure 9:
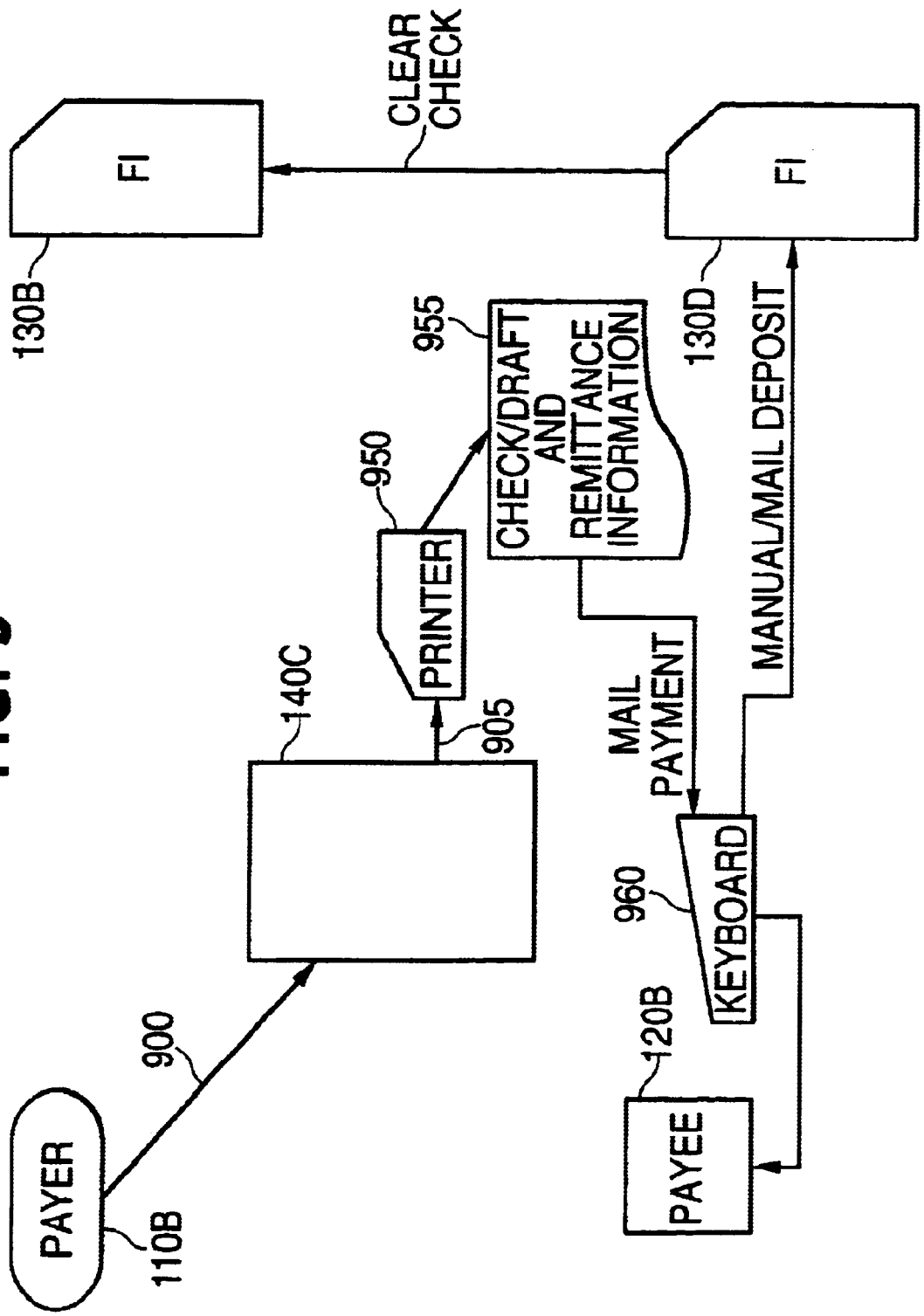
FIG. 9 depicts the communications between various network stations depicted in FIG. 1 to pay paper bills, in accordance with the present invention.
Figure 10:
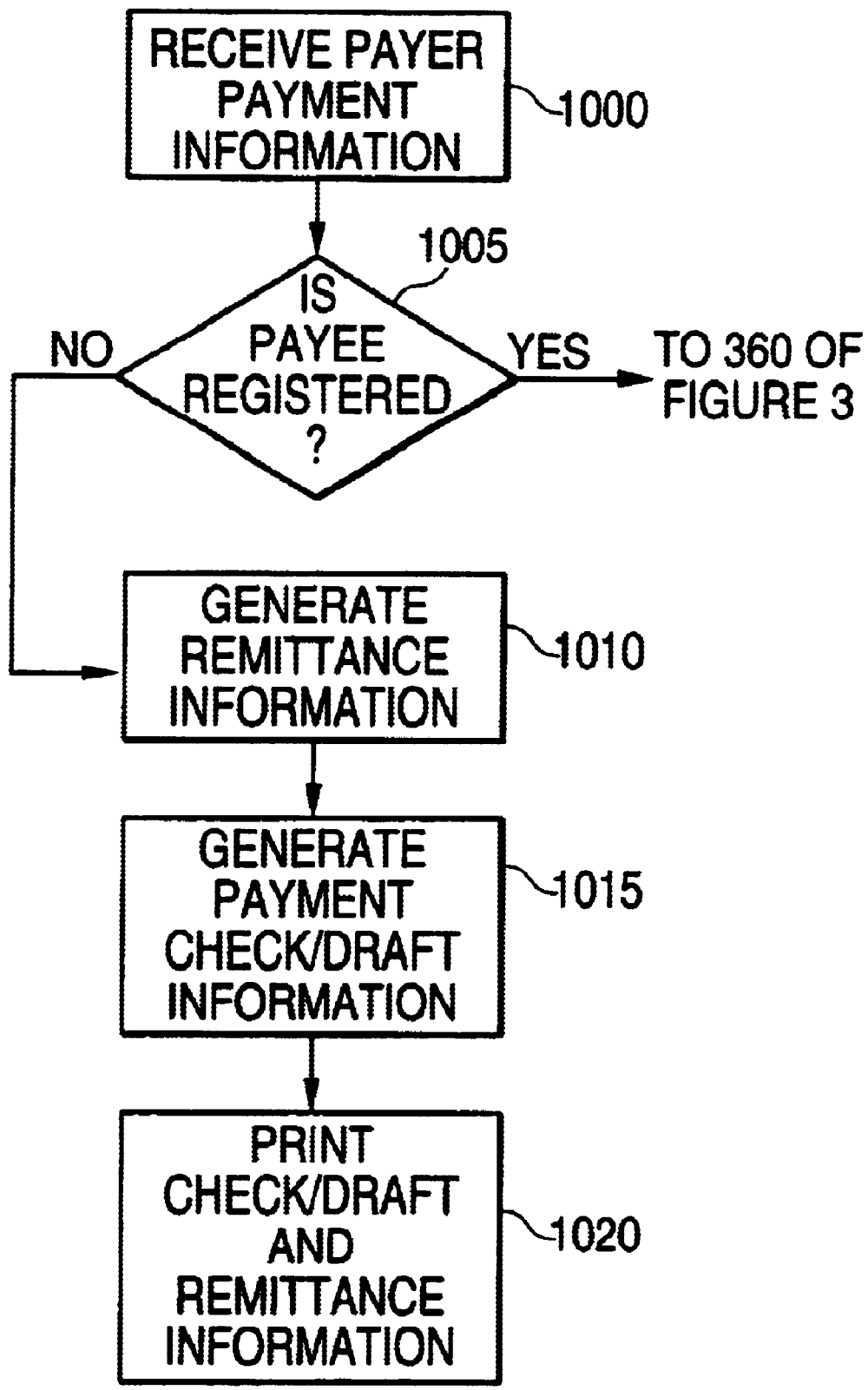
FIG. 10 is a flow chart showing the operations which are performed by the network stations in FIG. 9, in accordance with the present invention.

FIG. 9 depicts the communications necessary to perform electronic bill payment of a paper bill received by a registered payer via mail delivery from an unregistered payee. Communications will be described in conjunction with FIG. 10. In communication 900, a payment instruction, to pay the paper bill received by mail by registered payer B, is transmitted from payer station 110B to central station 140. The instruction is received by the central station processor 140A, as indicated in step 1000. The central station processor, in step 1005, makes a determination as to whether or not payee F is registered.

If payee F is determined to be registered, which is not the case here, processing continues with step 360 of FIG. 3. The subsequent steps shown in FIG. 3 could of course be modified as has been previously described with reference to FIGS. 4, 5 and 6.

If the payee F determined to be unregistered, as is the case here, the processor 140A generates remittance information in step 1010. The generated remittance information is preferably identical to that generated in step 360 of FIG. 3, but could be in a somewhat modified form particularly suitable for paper remittance if so desired. In step 1015 the central station processor 140A generates check/draft information. The generated remittance and check/draft information is transmitted in communication 905 to a printer 950 which, in step 1020, prints a paper check/draft and associated remittance information which form a payment document 955.

The payment document 955 is mailed to payee F. The remittance information is manually entered to the accounts receivable system being operating at payee station 120B using the keyboard 960. Once manually input, the accounts receivable system can process the remittance information and reconcile the payment with the applicable bill. The paper check is deposited either in-person or by mail in the deposit account of payee F which is maintained at the financial institute L, which is represented on network 100 by station 130D. The deposit amount is manually entered in the FI station 130D. The check is then cleared through the payer B's financial institute J, which is represented by FI station 130B, using conventional check clearing processes.

Preferably, the processor 140A also drives the printer 950 to print additional information notifying payee F of the availability of electronic bill presentation and payment services through the central station 140. As payee F receives more and more payments via the central station 140, payee F will become more and more motivated to present its bills and receive its payments electronically over the network 100, and hence to become a registered user of the network.

FIG. 11 shows a somewhat simplified depiction of a relational database 1100 suitable for user as database 140B1 of FIG. 1. FIG. 11 will be helpful in understanding the robustness of the central station 140. As indicated above, preferably each user for whom billing or remittance information is generated, whether or not a registered user, is identified with a user identifier. That is, all of the user identifiers are associated with users that have either pre-registered, been paid through the central station 140 at the request of a registered payer or have billing information which is stored at the central database 140B1 at the request of a registered payee.

As shown in FIG. 11, the user identifiers are stored in column 1105 of the relational database 1100. The registration status of each identified user is stored in column 1110, in association with the applicable identifier. As shown, the users A–C, E, and H–L are registered users, while users D, F and G are unregistered users. It should be noted that each of the financial institutes I–L are shown to be registered and hence have the ability to electronically present and pay bills, in addition to their previously described functions. The applicable financial institutes identifiers are stored in column 1115 for each of the registered users. Along with the financial institute identifiers are stored the applicable payment account number (PA) and/or deposit account number (DA) in column 1115. In column 1120 billing information can be temporarily stored for each user. As shown, billing information is currently stored for certain registered users as well as certain unregistered users in column 1120. In column 1125 remittance information can be temporarily stored for each user. As shown, remittance information is currently stored for certain registered users as well as certain unregistered users in column 1125.

The database 1100 allows any registered user to electronically bill and electronically pay any other user, whether registered or unregistered. Accordingly, the central station 140 can be properly characterized as a virtual money exchange and, as will be described in greater detail below, can be used to replace the current debit and credit card system as well as the currently used paper invoicing and payment system.

For example, with reference to FIG. 11, registered user A is a small business. It can receive electronic bills from and make electronic payments to its registered vendors, issue electronic bills to both its registered and unregistered customers, and receive electronic payments from its registered customers. In the snapshot of the database shown in FIG. 11, the database 1100 currently has stored, in association with the user A identifier, billing information from user A's registered vendors in column 1120 and remittance information from user A's registered customers in column 1125.

User B is also a registered small business. User B routinely pays bills electronically through the central station 140 but does not receive any electronic bills or payments through the central station 140 from other registered users. User B currently has no billing information or remittance information stored in the database 1100.

User C is a registered individual who receives electronic bills from and electronically makes payment of these and other bills to other registered users. User C currently has billing information stored in column 1120 of the database 1100. Although user C does not normally bill others either electronically or by paper invoice, there may be occasions on which user C will desire to electronically post a payment request.

For example, if user C is a child of user B and resides during the school year at college, user C may wish to request additional funds for his/her schooling from time to time. This can be accomplished by simply transmitting, via the Internet, an ASCII text bill for user B, identified by name and address, from user station 110C to central station 140. The request is processed by processor 140A as if the request were a bill, and the resulting billing information is stored in association with user B's identifier in column 1120 of the database 1100. User C can, if desired, also notify user B by Internet email that he/she has requested additional funds through the central station 140. User B, using station 110B, may now contact the central station 140 via the Internet to receive the billing information, and transmit a payment instruction to the central station 140 to make payment to user C's deposit account as previously described. In such a case, the requested funds are, for example, electronically transferred from user B's payment account, e.g. a checking account, at financial institute J to user C's deposit account, e.g. a checking account, at financial institute K.

As can be seen from the above, the central station 140 can be used to easily transfer funds between users of the system for any reason whatsoever. Further, such transfers can be requested and authorized without the need for the transacting parties to have any information other than commonly known identifying information relating to the other party, such as the other parties name and address.

As also shown in FIG. 11, user D is unregistered and accordingly has no associated financial institute identifier. However, billing information for user D has been stored in column 1120 of the database at the request of a registered user. For example, a utility company may want all of its bills posted in the database 1100. This will make it easier for registered users to pay their utility bills electronically. Additionally, if enough registered payees notify an unregistered user that the user's bills are available electronically, the unregistered user can be motivated to register and to begin receiving bills and making payments electronically.

User E is a registered user maintaining a deposit account at financial institute L. User E is another small merchant which receives payments electronically from its registered customers. Remittance information is currently stored in association with the user E identifier in column 1125 of the database 1100.

User F is yet another small merchant. User F is not registered for the service but receives paper payments and remittance information from registered users through the central station 140. To motivate user F to register, the central station may store electronic remittance information in association with the user F identifier in column 1125 of the database 1100, and notify user F of the availability of the electronic remittance information in an enclosure mailed with the paper payment and remittance documents.

User G is another unregistered user to whom electronic bill information has been posted, at the request of a registered user, in column 1120 of the database 1100 in association with a user G identifier.

User H is a registered user maintaining its payment and deposit accounts at financial institute K. As shown, user H receives electronic bills and electronic payments and currently has both billing information and remittance information stored in columns 1120 and 1125 of the database 1100.

Each of the financial institutes I–L are registered and use the central station 140 to receive electronic bills and to make electronic bill payments.

Figure 12:
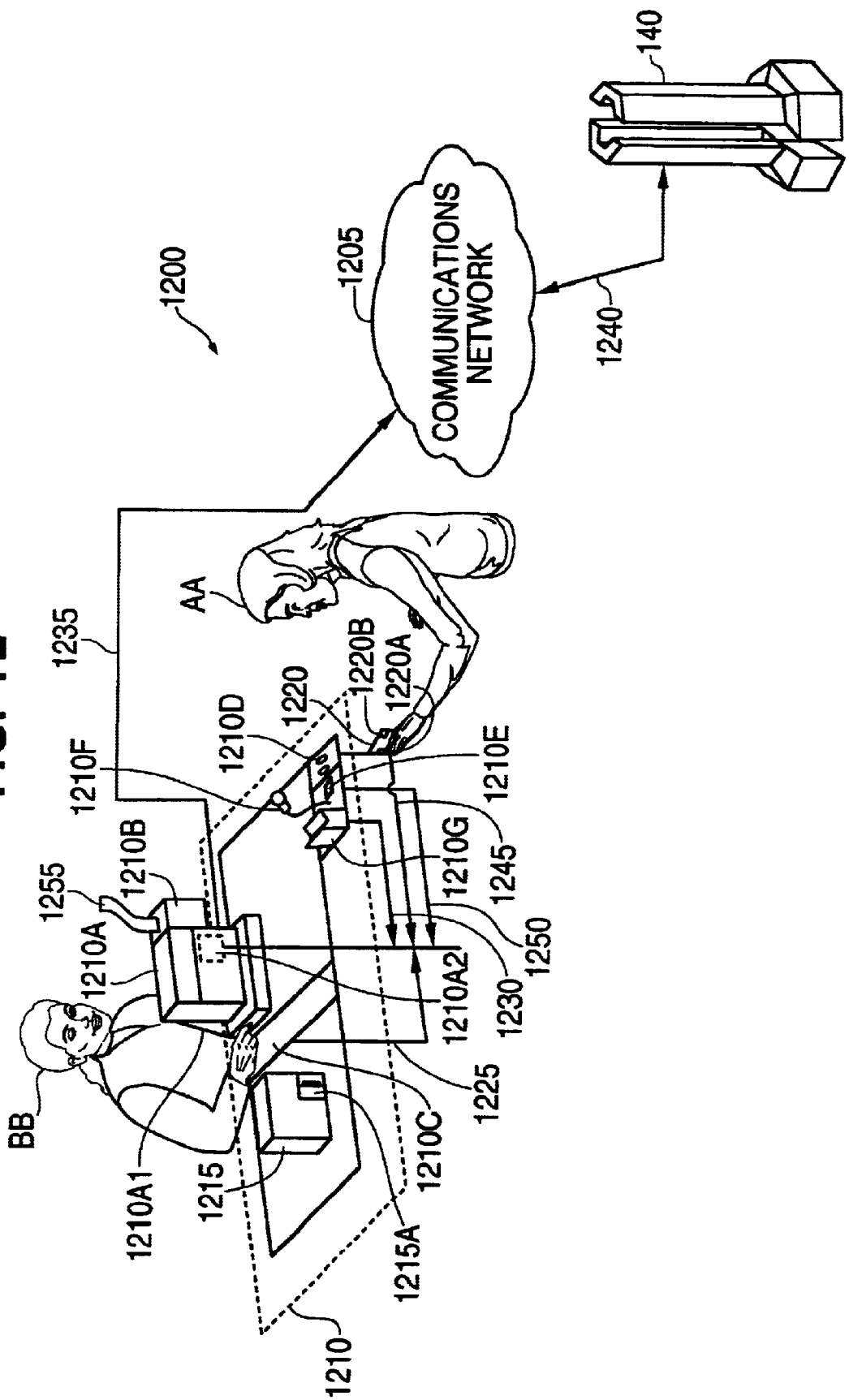
FIG. 12 depicts a cashless transaction network with an in-store register station, in accordance with the present invention.

FIG. 12 depicts a cashless transaction network 1200 which includes a communication network 1205 which could be the Internet or some other network. The cashless transaction network 1200 also includes a central clearinghouse station 140, identical to that previously described, and an in-store register station 1210. The in-store register station 1210 includes a register 1210A, a register receipt printer 1210B, and a product price scanner 1210C, which is typically an optical bar code reader. The register 1210A itself includes a register keyboard 1210A1 which can be used by the operator to manually input information. The register 1210A also includes a programmed processor 1210A2 for processing inputs to the register.

Additionally, the in-store register station 1210 includes various input devices which can be utilized by a customer to enter information. In this regard, the station 1210 includes a scanner 1210G, which is capable of reading information from a customer identification document such as a driver's license, passport or other identifying document. The scanner 1210G could, for example, be an optical scanner for reading a barcode or other indicia, an electro-magnetic reader for reading information stored on a magnetic strip embedded in the identifying document, or an electrical reader for reading information stored on a memory chip or other electrical circuit embedded in the identifying document.

Also included in the station 1210 is a keyboard 1210D, which can be used by a customer to manually input information, which can not be read by the scanner 1210G, from an identifying document and/or other information, such as a telephone number, social security number or other customer specific identifying information as might be desirable for further confirmation of the customer's identity. Further provided is a touch pad 1210E and associated pen 1210F, which can be used by the customer to sign a paper receipt at the time of purchase and at the same time digitize the customer's signature.

It will be understood that although a single in-store register station is shown, the network will include many in-store register stations distributed throughout a wide geographical area, if not the world. These stations will be located at retail store outlets of many different retailers as well as at facilities of vendors at different tiers of the distribution chains for many different products. Such stations may be located virtually anywhere in-person purchases are made, including department stores, supermarkets, specialty shops, manufacture outlet stores, restaurants, hotels, airports, wholesale supply stores, etc. In fact, at every location where business is now transacted in person using a credit card, debit card, or check, the current cashier station could be replaced by the register station 1210.

It will, of course, also be recognized that depending upon the type of goods or services being purchased, some of the components of the station 1210 may be unnecessary. For example, if customers only purchase services, there would be no need for the optical scanner 1210C. Also, it may be unnecessary to print receipts and accordingly the printer 1210B could potentially be eliminated. Also, one or more of the customer input devices 1210D–G could, if desired, be eliminated and the information could be input on the keyboard 1210A1 of the register 1210A by the station operator.

Figure 13:
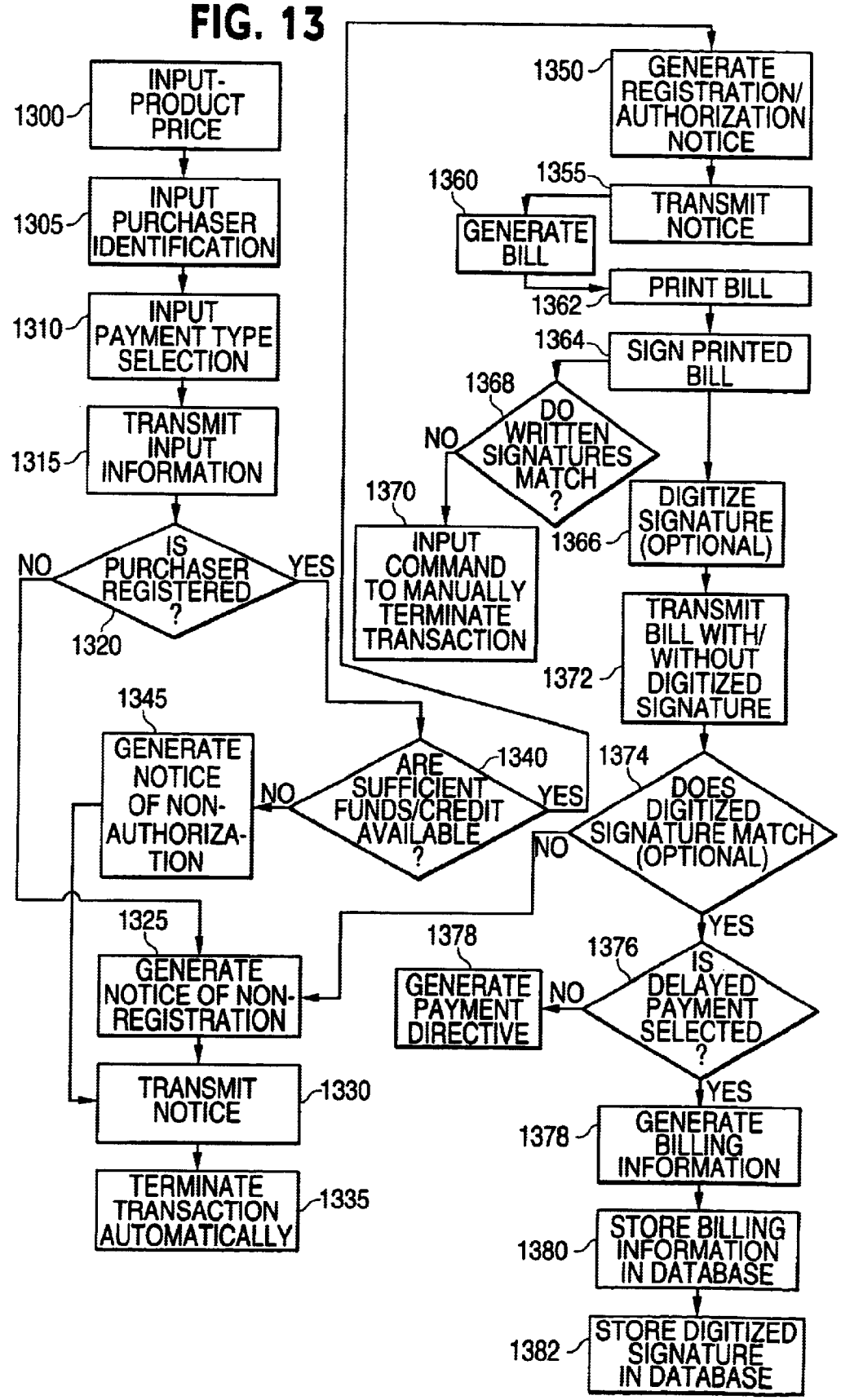
FIG. 13 is a flow chart showing the operations which are performed by the network stations in FIG. 12, in accordance with the present invention.

The operations of the network 1200 will now be described with reference to FIGS. 12 and 13. As shown in FIG. 12, a customer AA wishes to purchase a product 1215 at a retail store outlet. The product 1215 has a product code represented by a bar code 1215A printed on the product packaging. The station operator BB scans the barcode 1215A using the optical scanner 1210C in step 1300, and the total purchase price is shown as indicated on the register 1210A. The product price information is also fed to the register processor 1210A2 via a link 1225.

The customer AA uses his/her driver's license 1220 as an identifying document. The license includes a barcode 1220A which includes customer AA's name, address and driver's license number. The customer is also identified by a photograph 1220B on the driver's license 1220. The customer, in step 1305, swipes the driver's license 1220 through the scanner 1210G, which, in this case would be an optical barcode reader. The scanned information is transmitted via a link 1230 to the processor 1210A2 of the register 1210.

As previously discussed, the customer may be allowed to exercise the option to select either immediate or delayed payment of the purchase price of the product 1215. If this option is available, a selection can be made by inputting the desired payment type using the keyboard 1210D, as indicated in step 1310. The selection is transmitted via a link 1245 from the keyboard 1210D to the register processor 1210A2. The identifying information, payment type selection and price information is transmitted via the link 1235 to the communications network 1205 and from there to the central clearinghouse station 140 via link 1240, as indicated in step 1315.

The central clearinghouse station 140 determines in step 1320 if the customer AA is a registered user of network 1200, if not, a notice of non-registration is generated by the central station 140 in step 1325 and transmitted via link 1240 to the communications network 1205 and link 1235 to the register 1210 in step 1330. The register processor 1210A2 processes the received notice of non-registration and automatically terminates the transaction, as indicated in step 1335. At this point, customer AA may decide to proceed with the transaction by paying for the product with cash. Alternatively, if the customer still maintains a debit or credit card or still carries checks, these could also be used, if so desired, to proceed with the purchase.

If on the other hand, the customer AA is determined by central station 140 to be a registered user of the network 1200 in step 1320, a further determination is made by station 140 in step 1340 as to whether or not customer AA has sufficient deposited funds or credit to cover the purchase price. If the customer's payment is to be made with credit, the credit amount may be a credit limit which the customer has previously established with a financial institute for the payment account. However, if payment is to be made with deposited funds, sufficient money will need to have been previously deposited in the customers payment account maintained at the customer's financial institute.

In any event, if insufficient funds or credit are available, in step 1345 a notice of non-authorization is generated by the station 140 and transmitted as previously described in step 1330. The transaction is then automatically terminated as previously discussed, with reference to step 1335, by the register processor 1210A2. If sufficient funds or credit are available, a registration/authorization notice is generated by the station 140 in step 1350. It should be noted that registration can be verified to the register station 1210 prior to or simultaneously with the verification relating to the sufficiency of funds or credit. Thus, notices could be separately transmitted or transmitted together to the register station 1210. Further, the registration notice could, if desired, be implicit in the authorization notice generated in step 1350. Accordingly, as used herein, the notice of registration could be in virtually any form which indicates that a particular purchaser is registered with the network 1200 and/or is authorized to make a purchase. The station 140 transmits the authorization notice in step 1355 via the links 1240 and 1235, and communication network 1205, to the register station 1210.

The received authorization notice is processed by the station processor 1210A2, which generates a digital bill for the purchase price of the product in step 1360. The processor 1210A2 then directs the printer 1210B to print the bill in step 1362. The printed bill is identified with reference numeral 1255 in FIG. 12. The customer AA can now place a signature on the printed bill using the pen 1210F and signature pad 1210E, as indicated in step 1364. The signature read by the pad 1210E is, as previously discussed, digitized in step 1366 and transmitted via link 1250 to the register processor 1210A2. It should be noted that, the digitizing of the signature is an optional step. As indicated in step 1368, the register operator BB will also typically check the written signature on the paper receipt 1255 against the signature on the identifying document, here a driver's license 1220B, to verify that the signatures are consistent. If the operator BB concludes that the signatures do not match the operator can input a command on the keyboard 1210A1 of the register 1210A to manually terminate the transaction, as indicated in step 1370.

The register processor 1210A2 directs the transmission of the bill in electronic form, with or without the digitized signature, via links 1235 and 1240, and communication network 1205, to the central clearinghouse station 140 in step 1372. In step 1374, the station processor 140A, optionally compares the received digitized signature with a digitized signature for the identified customer AA which has been previously stored on the station memory 140B, preferably in the database 140B1. If no match is found, processing proceeds with step 1325 as previously described, and the transaction is ultimately terminated.

If the signatures match, a determination is made in step 1376 as to whether immediate or delayed payment has been selected. If immediate payment was selected, the central clearinghouse station processor 140A proceeds, in step 1378, to generate a pay directive as has been previously described. If delayed payment has been selected, billing information is generated by processor 140A in step 1378 and stored in the database 140B1 in step 1380, as has also been previously described. The digital signature, if available, may also be stored in the database 140B1 in step 1382. The registered user AA can now access the electronic billing information and authorize payment as has been previously discussed.

Figure 14:
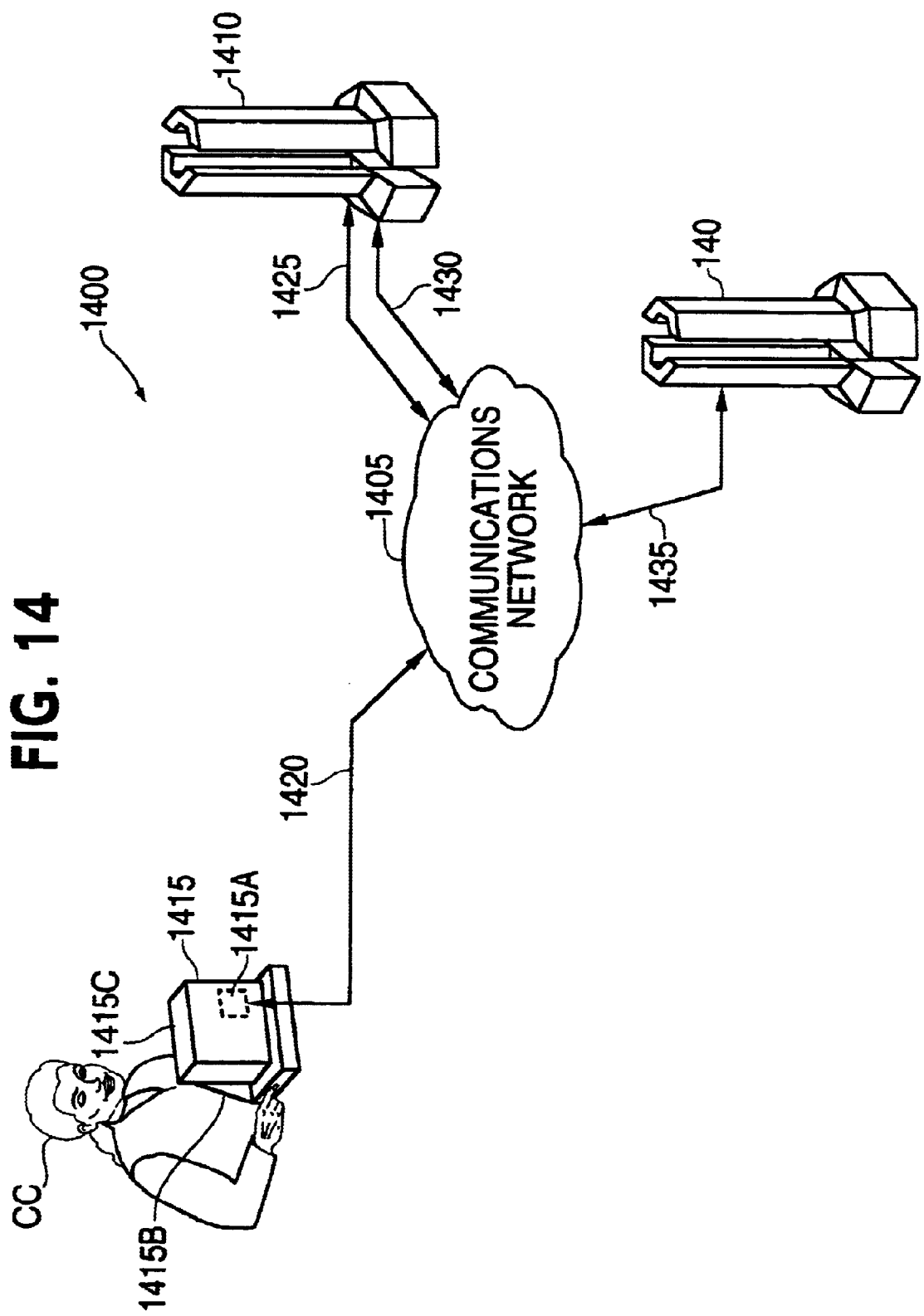
FIG. 14 depicts a cashless transaction network with a virtual store Internet server station, in accordance with the present invention.

FIG. 14 depicts a cashless transaction network 1400 for cashless purchases from virtual storefronts on a communications network such as the Internet. As shown in FIG. 14 the network 1400 includes a customer station 1415 which interconnects via a link 1420 with communications network 1405. The customer station 1415 is shown to be a standard off-the-shelf personal computer which includes a processor 1415A operating conventional network communication software, including a browser. A virtual storefront server 1410 also connects to the communication network 1405. Communications between the customer station 1415 and the virtual storefront server 1410 are carried out over links 1420 and 1425, and communications network 1405. As also shown in FIG. 14, another link 1430 connects the virtual storefront server 1410 to the communications network 1405. The central clearinghouse station 140, connects to the communications network 1405 via a link 1435. Links 1430 and 1435, and the communications network 1405, are utilized for communications between the virtual storefront server 1410 and central clearinghouse station 140.

Referring now also to FIG. 15, the operation of the cashless transaction network 1400 will be described. In step 1500, the customer CC using the station 1415, operating the browser, to establish an Internet link with the virtual storefront server 1410. As previously discussed, the Internet link includes the links 1420 and 1425, and communications network 1405. Using the station keyboard 1415B, or other type input device, such as a mouse (not shown), the customer CC selects a product for purchase in step 1500 based upon a product description and price information transmitted from the server 1410 to the customer station 1415, via the links 1420 and 1425, and communications network 1405, and viewed on the monitor 1415C, as is conventional.

In step 1505, the customer CC enters identifying information using the keyboard 1415B of station 1415. The identifying information is the same as that previously described with reference to FIGS. 12 and 13. It will of course be recognized that if the customer CC is purchasing items for his/her employer, the employer's identifying information rather than the personal identifying information of purchaser CC would be entered. The customer CC, in step 1510 also enters a payment type selection using the keyboard 1415B or other type input device.

In step 1515, the station processor 1415A directs the transmission of the product selection, customer identification and payment type information, via links 1420 and 1425, and communications network 1405, to the server 1410. The server 1410 processes the received information and generates a registration/authorization request in step 1520. It will be recognized by those skilled in the art that the information could be transmitted in step 1515 directly from the station 1415 to the central clearinghouse station 140 via a separate link from station 1415 to the communications network 1405 and another link from the communications network to the central clearinghouse station 140. This could be facilitated by, for example, including a hyper-link to the station 140 in the information provided by the virtual storefront server 1410 to the customer station 1415.

The virtual storefront server 1410, in step 1525, transmits the registration/authorization request, via links 1430 and 1435 and the communications network 1405, to the central clearinghouse station 140. The registration/authorization request includes the purchaser identification, the selected payment type and the total purchase price. In step 1530, the central clearinghouse station 140 determines if the customer CC, or other identified purchaser, is registered. If not, in steps 1535 and 1540 a notice of non-registration is generated and transmitted, via links 1430 and 1435, and communication network 1405, to the virtual storefront station 1410. Based upon the receipt of the notice of non-registration, in step 1545 the virtual storefront station 1410 automatically terminates the purchase transaction.

If the identified purchaser is registered, in step 1550 the central clearinghouse station 140 determines if sufficient funds are available for the purchase. If not, in step 1555 a notice of non-authorization is generated by the central clearinghouse station 140 and transmitted to the virtual storefront station 1410 to automatically terminate the transaction as previously described in steps 1540 and 1545. If sufficient funds are available, the central clearinghouse station 140 generates a registration/authorization notice in step 1560, and transmits the notice in step 1565, via links 1435 and 1430 and communications network 1405, to the virtual storefront station 1410.

Based upon the receipt of the registration/authorization notice the virtual storefront station 1410 generates a digital bill and delivery directive in step 1570. The station 1410 then directs the transmission of the bill and delivery directive, via links 1430 and 1435, and communication network 1405, to the central clearinghouse station 140 in step 1575. The central clearinghouse station 140 processes the received bill and delivery directive by first determining if delayed payment has been selected, as shown in step 1580. If not, the central clearinghouse station 140 promptly generates a payment directive in step 1585 so that funds may be immediately paid to the Internet merchant represented by the station 1410 as previously described. If delayed payment has been selected, billing information is generated in step 1590 and stored in step 1595 in the database 140B1.

It should be understood that in the full implementation of the present invention, a single cashless transaction network would include both in-store register stations 1210 and virtual storefront stations 1410. Accordingly, customers would be able to utilize the network to purchase goods and services both in-person and over the Internet using the same preexisting identifying information and without the need to disclose any information regarding the payment account. Hence customers will, no longer need a Visa™ card, MasterCard™, Discover™ card or any other credit or debit card, or checks to purchase goods and services.

As described herein, the present invention provides an electronic bill presentment and/or bill payment technique, which reduces the potential barriers to use for individuals, small business entities and others who may currently be reluctant to register for such services. The present invention also provides a clearinghouse for electronically presenting and/or paying bills to a large number of users, including a large number of users of a public network such as the Internet. Using the present invention will dramatically change how consumers pay for products and how merchants bill and recoup payments from consumers. The present invention makes conventional credit and debit cards obsolete, and also eliminates any need for paper bills and paper checks or other paper instruments to purchase and pay for goods and services.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. electronic bill presentment and/or payment, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. A method for performing cashless transactions, comprising the steps:
    transmitting information identifying a purchaser of a product without identifying a payment account for the purchaser;
    receiving the transmitted identifying information at a central processing point;
    processing the received identifying information at the central processing point to determine if the purchaser is a registered purchaser;
    transmitting a notice confirming registration, from the central processing point, if the purchaser is determined to be a registered purchaser;
    receiving the transmitted notice at the point of purchase; and
    generating, at the point of purchase, a bill for the purchased product responsive to receipt of the notice.

2. A method according to claim 1, further comprising the step of:
    scanning a document to obtain the information identifying the purchaser.

3. A method according to claim 2, wherein the document is a government issued document.

4. A method according to claim 2, wherein the document is one of a drivers license and a passport.

5. A method according to claim 1, wherein the payment account includes one of credited funds and deposited funds.

6. A method according to claim 1, further comprising the steps of:
    transmitting a purchase price of the product;
    processing the received purchase price at the central processing point to determine if the purchase price exceeds a threshold amount; and
    transmitting an authorization for the purchase if the purchase price is determined not to exceed the threshold amount.

7. A method according to claim 6, wherein the purchase price is transmitted from the point of purchase.

8. A method according to claim 6, wherein the notice and the authorization are transmitted as a unitary transmission.

9. A method according to claim 1, further comprising the step of:
    printing the generated bill at the point of purchase.

10. A method according to claim 9, further comprising the steps of:
    obtaining a signature of the purchaser on the printed bill; and
    digitizing the obtained signature.

11. A method according to claim 1, further comprising the steps of:
    transmitting the generated bill from the point of purchase; and
    receiving the transmitted bill at the central processing point.

12. A method according to claim 11, further comprising the steps of:
    centrally processing the transmitted bill to generate billing information representing the bill; and
    storing the billing information in a central database so as to be accessible to the purchaser.

13. A method according to claim 12, further comprising the steps of:
    associating a digitized signature of the purchaser with the bill at the point of purchaser;
    transmitting the associated digitized signature from the point of purchase; and
    storing the transmitted digitized signature in the central database with the stored billing information.

14. A method according to claim 1, further comprising the steps of:
    transmitting the generated bill from the point of purchase;
    receiving the transmitted bill at the central processing point;
    selecting one of immediate payment of the bill and delayed payment of the bill;
    centrally processing the transmitted bill to generate billing information representing the bill; and
    storing the billing information in a central database so as to be accessible to the purchaser only if delayed payment is selected.

15. A method according to claim 1, further comprising the steps of:
    transmitting the generated bill from the point of purchase;
    receiving the transmitted bill at the central processing point;
    selecting one of immediate payment of the bill and delay payment of the bill; and
    centrally processing the transmitted bill to automatically generate a directive to pay the transmitted bill if immediate payment is selected.

16. A method according to claim 1, wherein the information identifying the purchaser is transmitted to the central processing point from the point of purchase.

17. A cashless transaction network, comprising:
    a central processing station configured to receive information identifying a purchaser of a product without identifying a payment account for the purchaser, to process the received identifying information to determine if the purchaser is a registered purchaser, and to transmit a notice confirming registration if the purchaser is determined to be a registered purchaser; and
    a point of sale station configured to receive the transmitted notice, and to generate a bill for the purchased product responsive to the receipt of the notice.

18. A network according to claim 17, wherein the point of sale station is further configured to transmit the information identifying the purchaser to the central processing station.

19. A network according to claim 17, wherein the point of sale station includes a scanner configured to read the information identifying the purchaser from a document.

20. A network according to claim 17, wherein:

the point of sale station is further configured to transmit a purchase price of the product;

the central processing station is further configured to process the received purchase price to determine if the received purchase price exceeds a threshold amount; and the notice includes a purchase authorization if the purchase price is determined not to exceed the threshold amount.

21. A network according to claim 17, wherein the point of sale station includes a printer configured to print the generated bill.

22. A network according to claim 21, wherein the point of sale station includes a electronic signature pad configured to digitize a signature of the purchaser on the printed bill.

23. A network according to claim 22, wherein the point of sale station is further configured to transmit the generated bill and the digitized signature to the central processing station.

24. A network according to claim 23, wherein the central processing station is further configured to receive the transmitted bill and the transmitted digitized signature, to store information corresponding to the received bill and the received digitized signature so as to be accessible to the purchaser.

25. A network according to claim 17, wherein the point of sale station is further configured to transmit the generated bill to the central processing station.

26. A network according to claim 25, wherein the central processing station is further configured to process the transmitted bill to generate billing information representing the bill, and includes a central database configured to store the billing information so as to be accessible to the purchaser.

27. A network according to claim 26, wherein:

the point of sale station includes an input device configured to receive an input representing a selection of one of immediate payment of the bill and delayed payment of the bill, and is further configured to generate payment selection information representing the input payment selection and transmit the payment selection information to the central processing station; and the central processing station is further configured to direct the storage of the billing information in a central database only if the transmitted payment selection information represents the selection of delayed payment, and to automatically direct payment of the purchase only if the transmitted payment selection information represents the selection of immediate payment.

28. A system for cashless transaction system, comprising:

a processor configured to receive information identifying a purchaser of a product to be purchased from any one of a plurality of different sellers, without identifying a payment account for the purchaser, to transmit a purchase authorization, to receive a bill corresponding to a purchase price of the product, to generate billing information representing the received bill; and a memory configured to store the billing information so as to be accessible to the purchaser on request.

29. A system according to claim 28, wherein the processor is further configured to:

receive payment type selection information representing a selection of one of immediate payment and delayed payment, to direct storage of the generated billing information in the memory if the received payment type selection information represents the selection of delayed payment, and to automatically direct payment of the purchase price only if the received payment type selection information represents the selection of immediate payment.

30. A cashless transaction network, comprising:

a plurality of point of sale stations representing a plurality of different sellers; and a central processing station configured to receive information from each of the plurality of point of sale stations, the received information identifying a plurality of different purchasers of different products without identifying payment accounts for the plurality of different purchasers, to process the received identifying information to determine if each of the plurality of purchasers is a registered purchaser, and to transmit notices confirming registration of those of the plurality of purchasers determined to be registered;

wherein the plurality of point of sale stations are configured to receive the transmitted notices, and to generate bills, each representing a purchase price of the one of the respective purchased products being purchased by those of the plurality of purchasers determined to be registered, responsive to receipt of the notices.

31. A network according to claim 30, wherein the plurality of point of sale stations are further configured to transmit the generated bills to the central processing station and the central processing station is further configured to generate billing information representing the transmitted bills, and further comprising:

a central database configured to store the billing information so as to be accessible to those of the plurality of purchasers determined to be registered.

\* \* \* \* \*